United States Patent [19]

Brobeck et al.

[11] 3,946,220
[45] Mar. 23, 1976

[54] POINT-OF-SALE SYSTEM AND APPARATUS
[75] Inventors: William M. Brobeck, Orinda; John S. Givins, Jr., Berkeley; Philip F. Meads, Jr., Oakland; Robert E. Thomas, Walnut Creek, all of Calif.
[73] Assignee: Transactron, Inc., Berkeley, Calif.
[22] Filed: June 10, 1974
[21] Appl. No.: 477,844

[52] U.S. Cl. .............................. 235/168; 340/172.5
[51] Int. Cl.² .................. G06F 15/02; G06F 15/20
[58] Field of Search ........... 235/168, 164, 160, 159, 235/156; 340/172.5

[56] References Cited
UNITED STATES PATENTS

| | | | |
|---|---|---|---|
| 3,253,132 | 5/1966 | Pendleton | 235/168 |
| 3,267,436 | 8/1966 | Alpert et al. | 340/172.5 |
| 3,330,947 | 7/1967 | Alpert et al. | 235/176 |
| 3,631,403 | 12/1971 | Asbo et al. | 340/172.5 |
| 3,710,085 | 1/1973 | Brewer et al. | 235/168 |
| 3,748,452 | 7/1973 | Ruben | 235/168 |

*Primary Examiner*—David H. Malzahn
*Attorney, Agent, or Firm*—Eckhoff, Hoppe, Slick, Mitchell & Anderson

[57] ABSTRACT

A point-of-sale terminal system including one or more keyboard terminals and associated cash drawers in communication with a control chassis having a microcomputer, a printer and power supply. Each keyboard terminal has manually operable keys for designating the various items for sale and associated display devices which, under the guidance of the computer, display the number of each item ordered. Function keys are provided for instructing the computer to total the sales price of each order with automatic tax calculation. Provision is made for the temporary storage of one or more orders with a recall feature that redisplays the order. Numeral keys are provided at the keyboard to give an alternate method of incrementing and decrementing item quantities and to provide means for effecting price and tax changes. Order changes may be effected at any time prior to the total sales price calculation that enters the sales price and item quantities into the computer's permanent memory.

13 Claims, 12 Drawing Figures

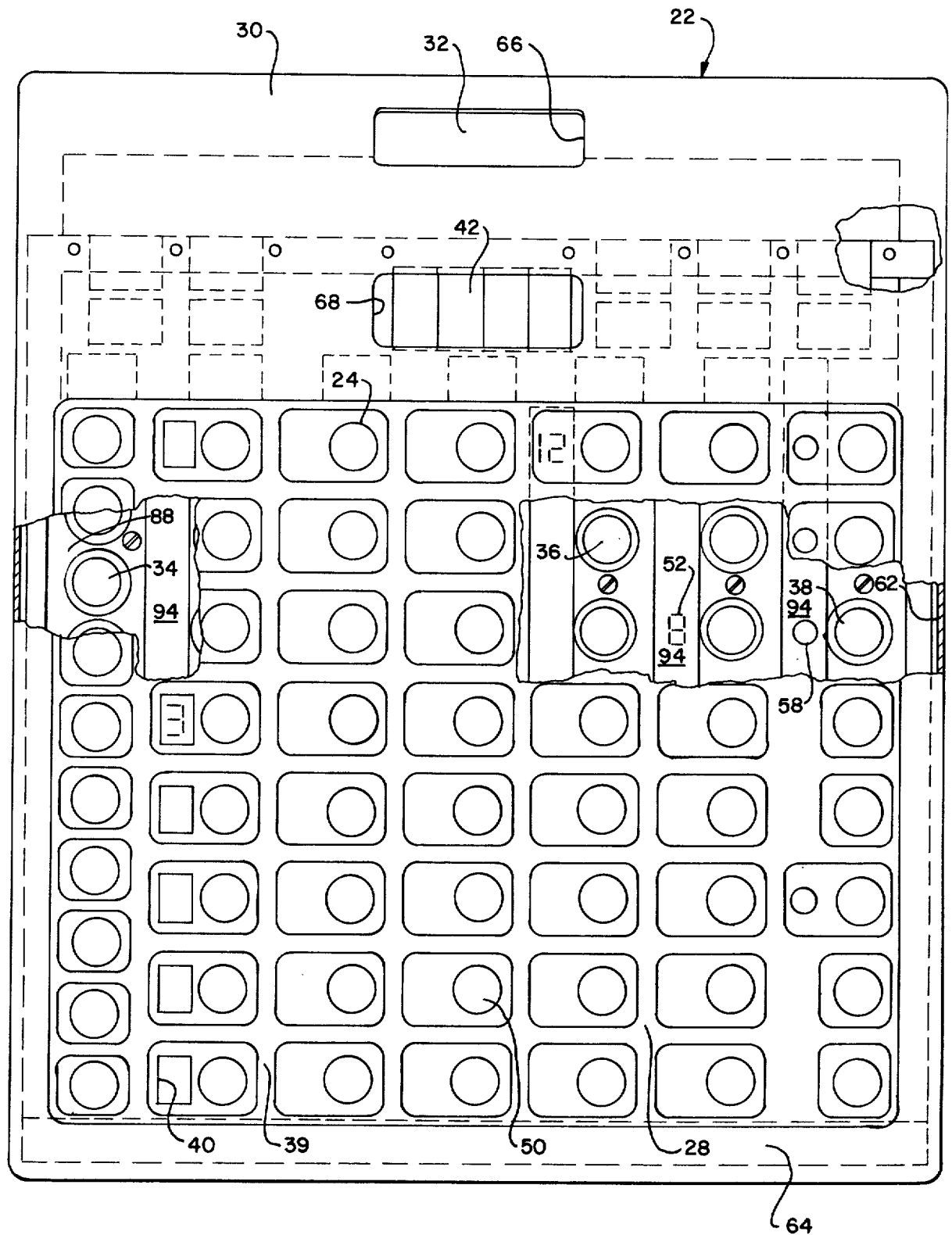
FIG.—1

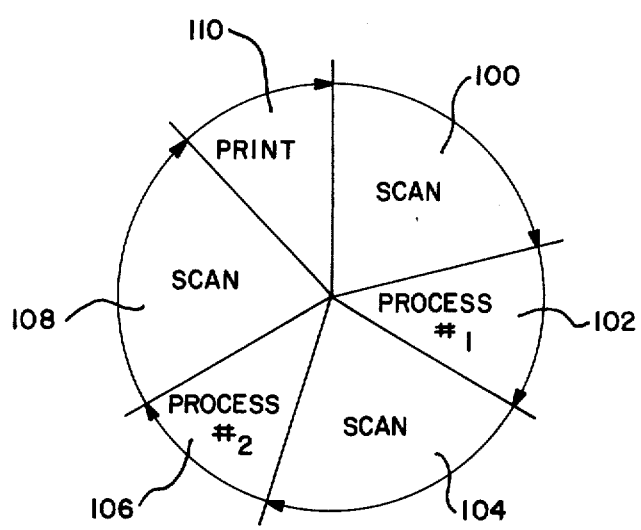
FIG.—3
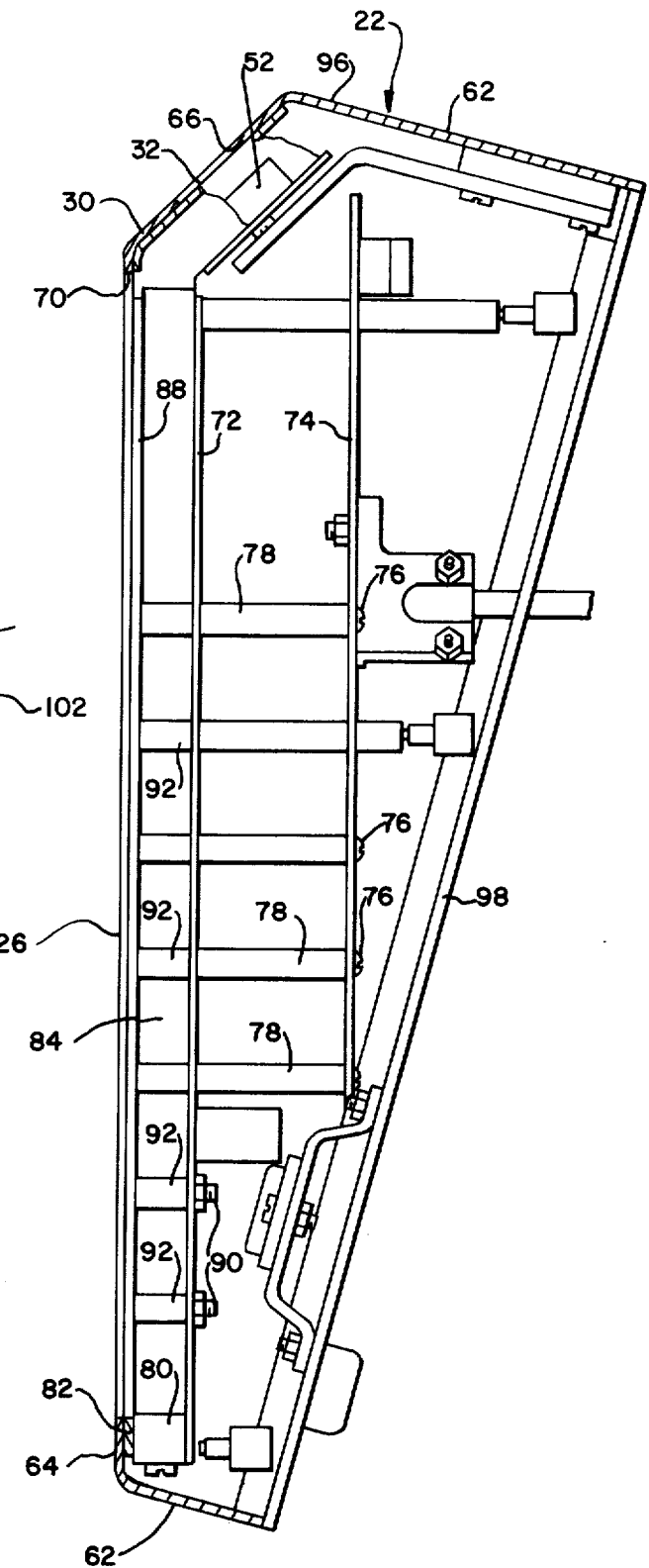
FIG.—2

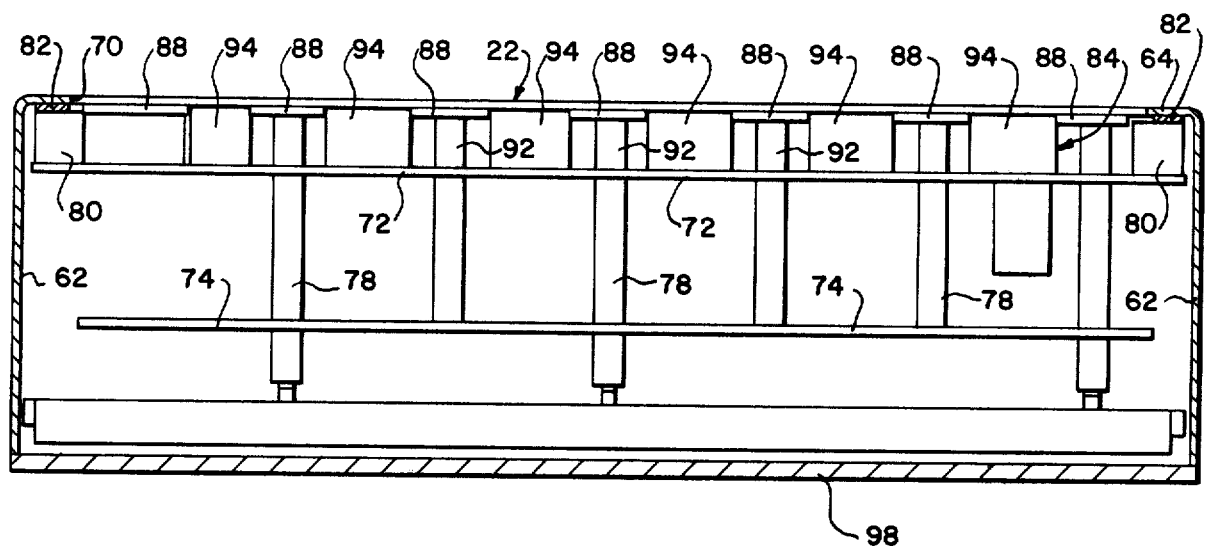
FIG.—4
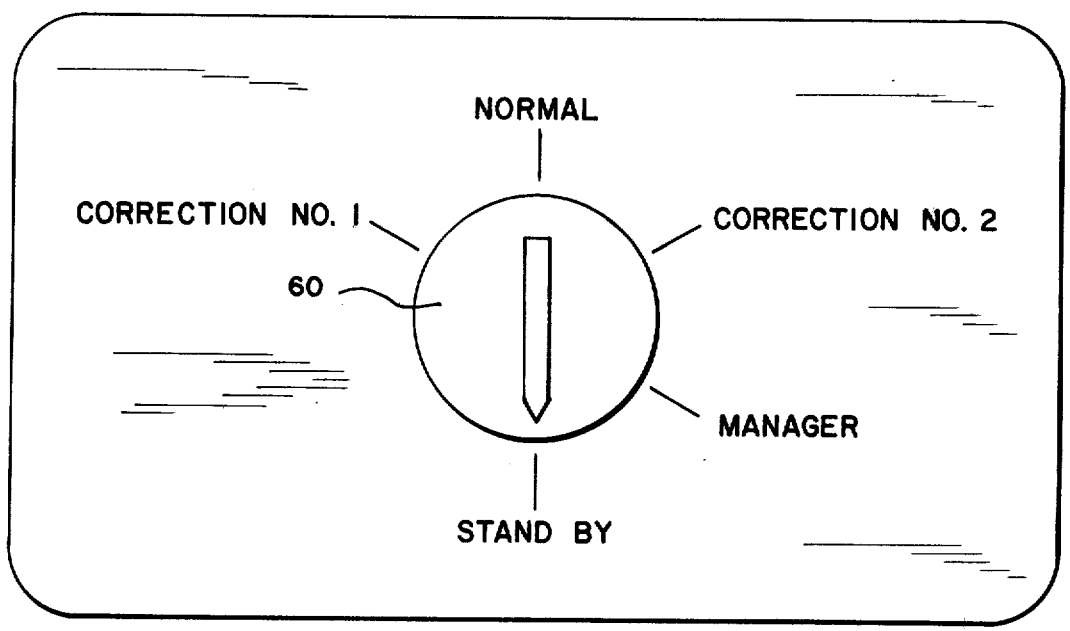
FIG.—5

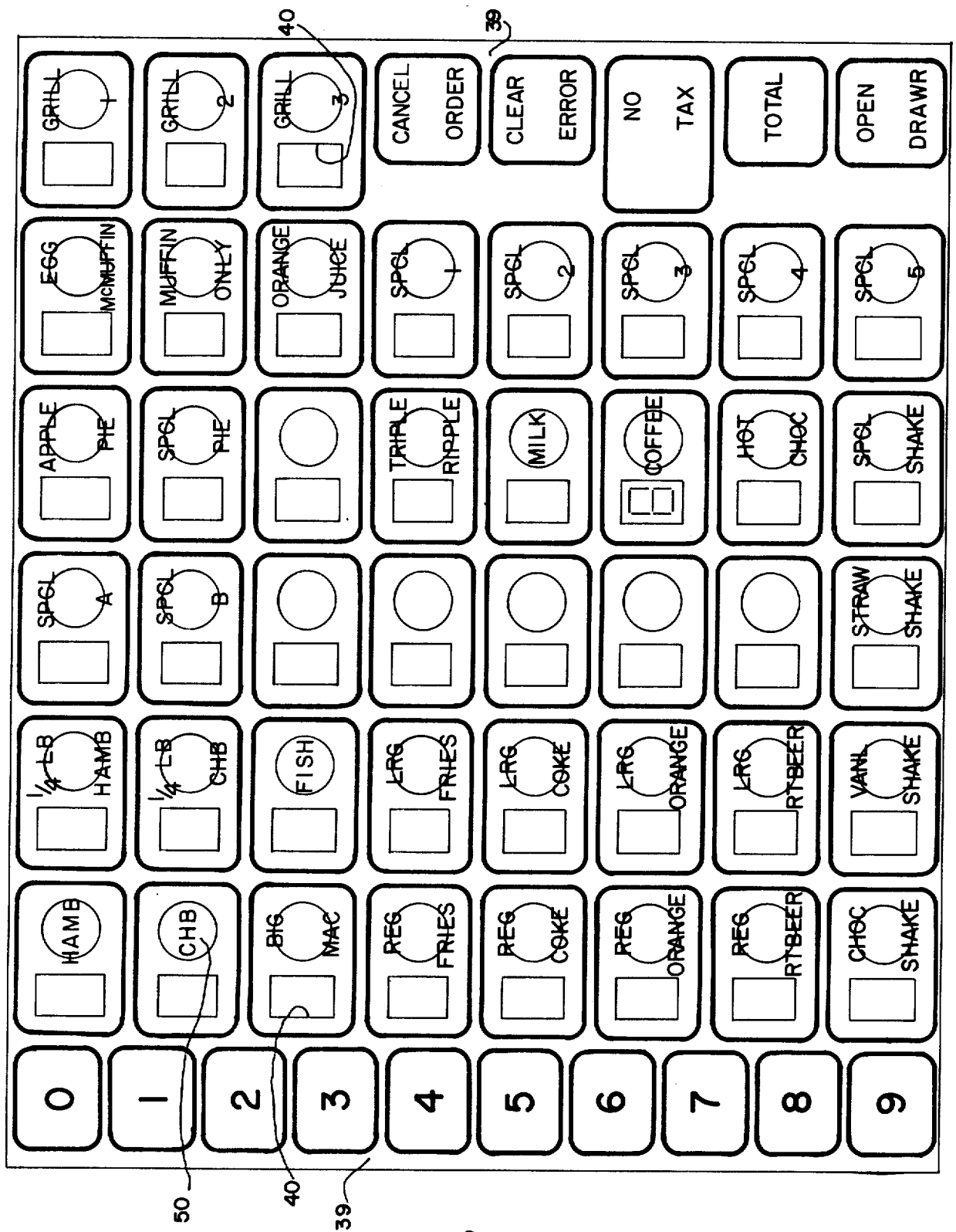
FIG.—6

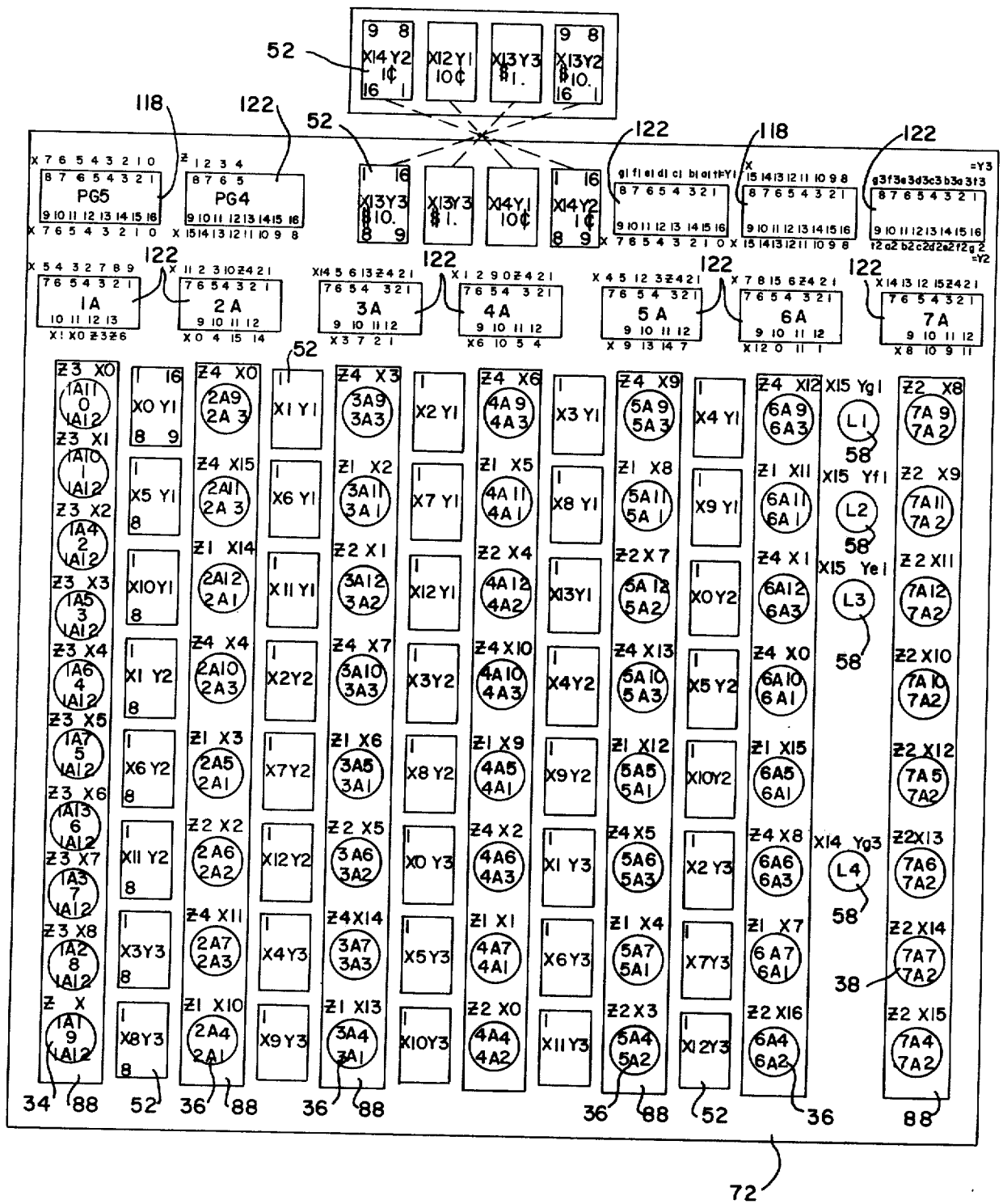
FIG.—7

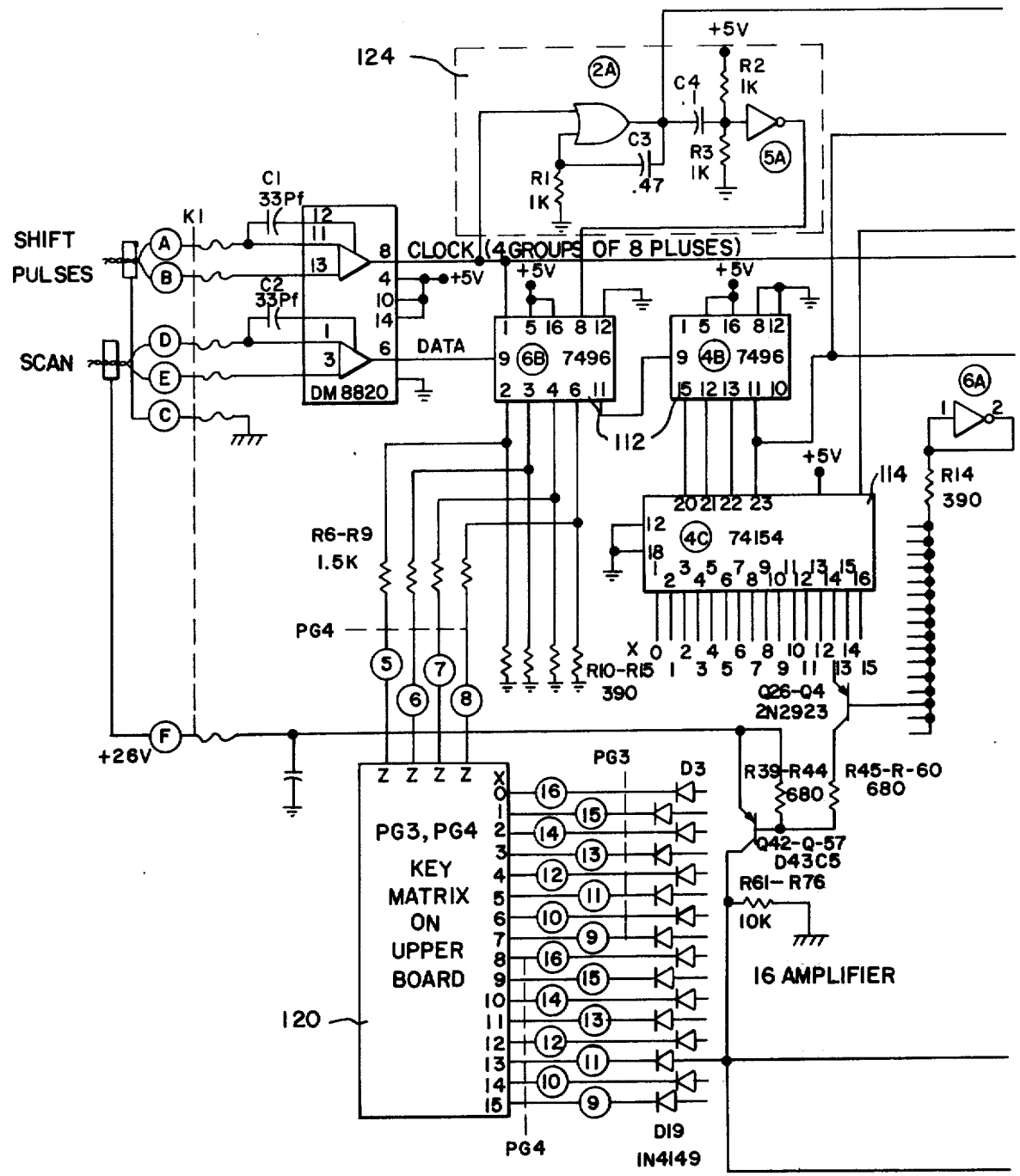
FIG.—8A

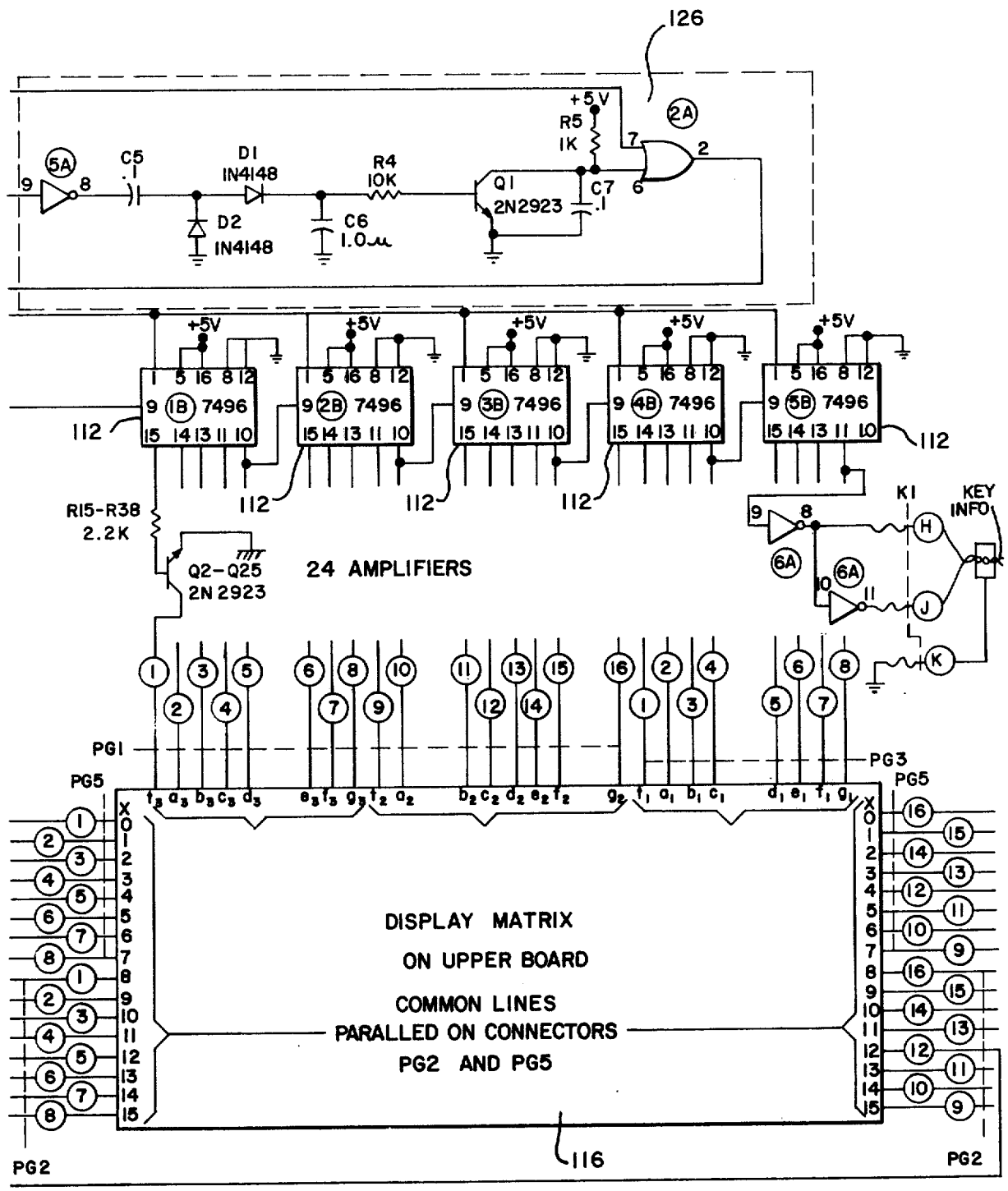
FIG.—8B

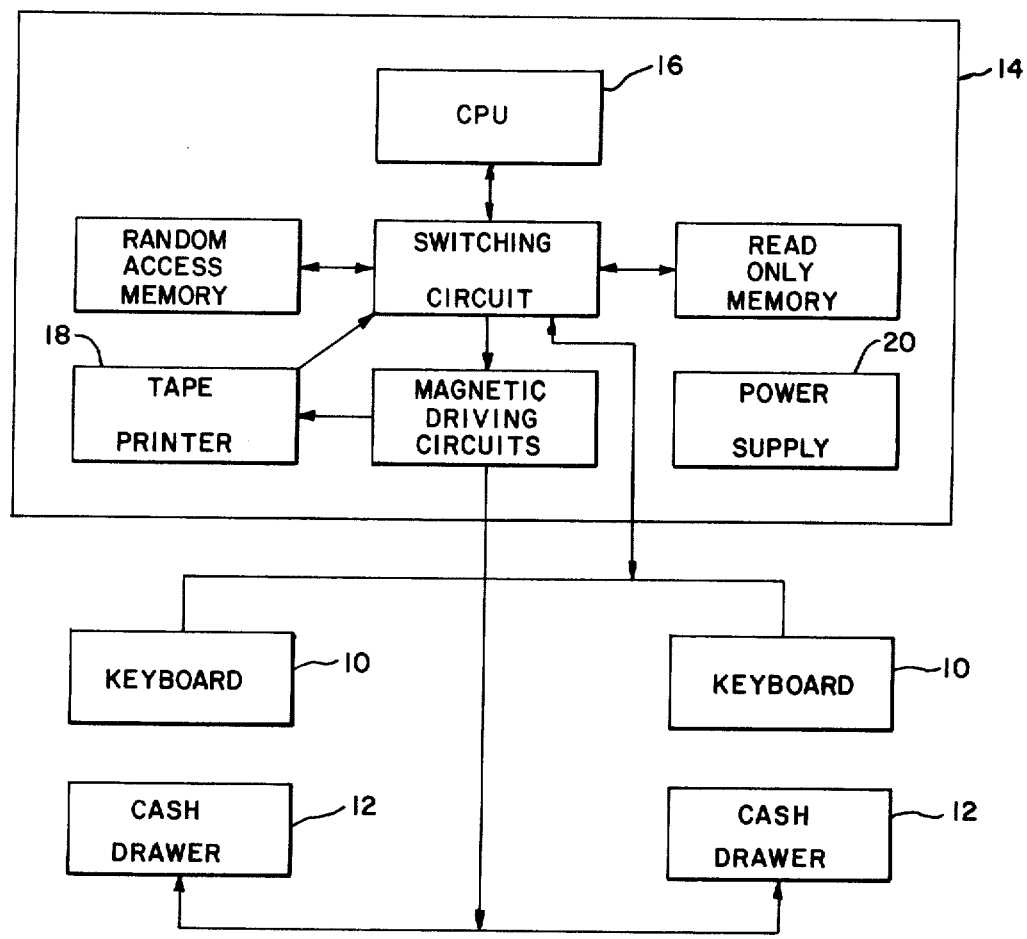
FIG.—10
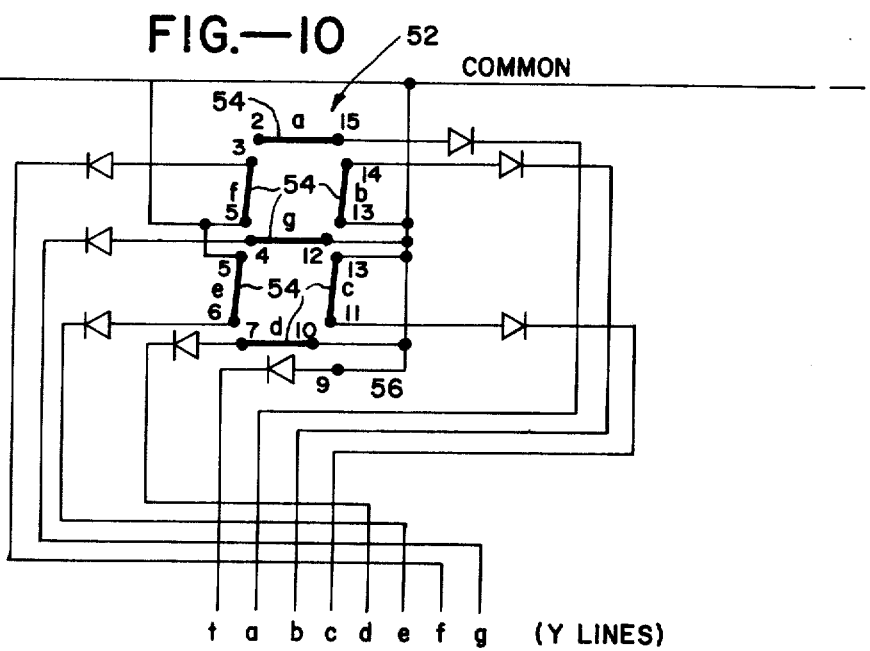
FIG.—9

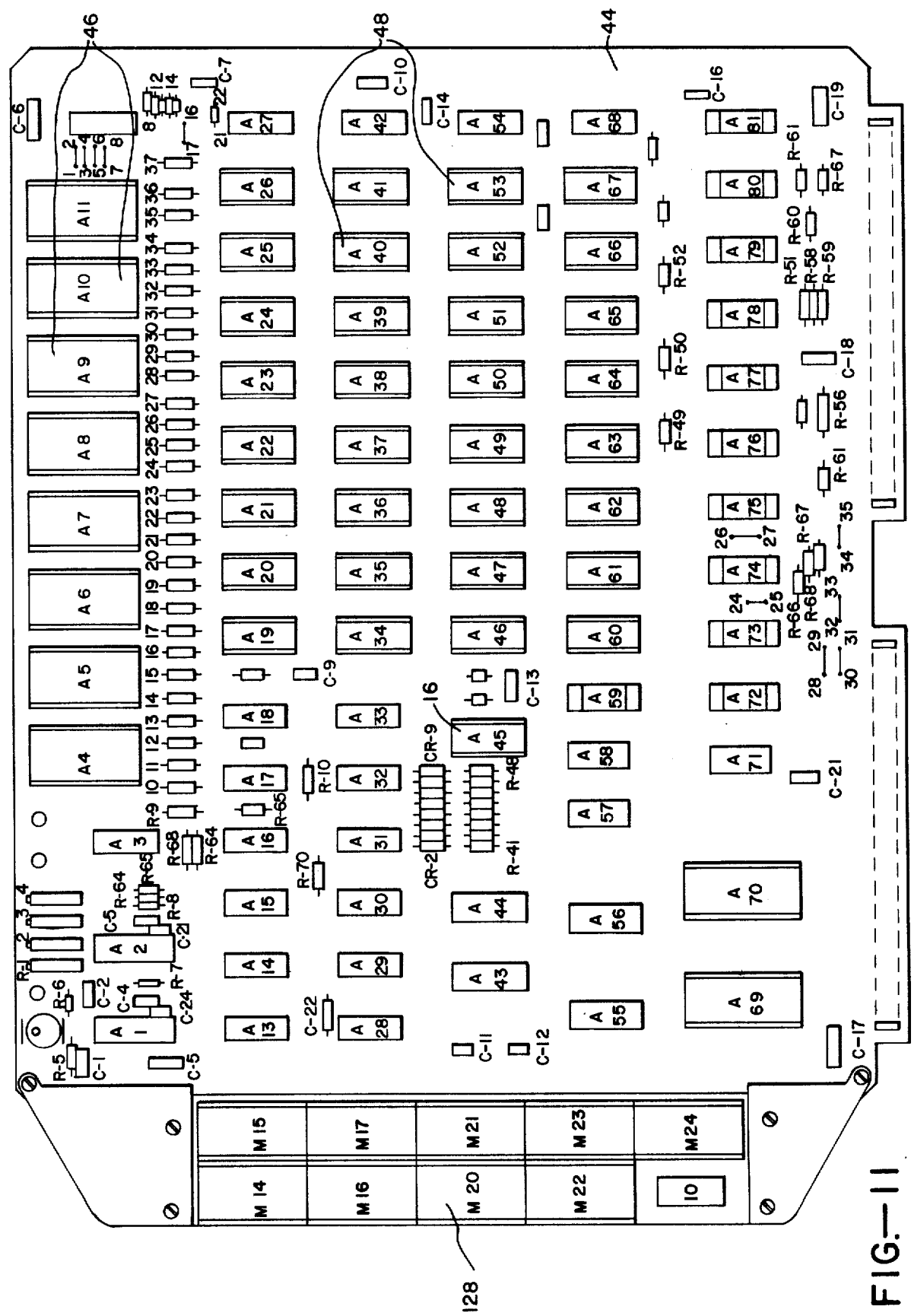
FIG.—11

POINT-OF-SALE SYSTEM AND APPARATUS

The invention relates to a system for entering customer orders at point-of-sale stations, processing and recording said orders in a central computer and returning processed order information to said station for display.

In brief, the invention comprises a system having one or more keyboard terminals at point-of-sale stations in communication with a central computer. Each keyboard terminal has a plurality of manually operable keys for designating the various items offered for sale. A plurality of display devices are provided on the keyboard and each item key has an associated display device for displaying the number of items being ordered. Means are also provided for generating an identifying signal specific to each key when said key is actuated. Logic means in the computer act in response to said signals to cause the display devices associated with the actuated keys to display the number of items ordered. The keyboards may also be provided with numeral keys and, in such case, item quantities may be entered by successive actuation of the item keys, or, alternatively, by the actuation of a numeral key followed by the actuation of an item key. In the latter case, the computer logic means will cause the associated display device to display a number corresponding to the particular numeral key actuated. Provision is also made for a plurality of function keys on the keyboard terminal for designating such steps as cancel order, total sales price or store and recall order.

In the drawings:

FIG. 1 is a plan view of one form of a keyboard terminal, partly in section;

FIG. 2 is a sectional view through the keyboard terminal of FIG. 1;

FIG. 3 is a schematic representation of one cycle of computer operation;

FIG. 4 is a transverse sectional view through the keyboard terminal of FIG. 1;

FIG. 5 is a front view of the control switch on the control chassis for the system;

FIG. 6 is a plan view of one form of menu sheet that may be used with the keyboard terminal of FIG. 1;

FIG. 7 is a plan view of the upper circuit board of the keyboard terminal shown in FIG. 1;

FIG. 8A is the left hand portion of a schematic diagram of the lower circuit board of the keyboard terminal shown in FIG. 1;

FIG. 8B is the right hand portion of a schematic diagram of the lower circuit board of the keyboard terminal;

FIG. 9 is a wiring diagram of one form of display device which may be used in the keyboard terminal;

FIG. 10 is a block diagram of the system; and

FIG. 11 is a plan view of the circuit board for the computer showing the central processor unit and the read-only memory (ROM) and random-access memory (RAM) banks.

GENERAL DESCRIPTION

The point-of-sale system of the present invention (FIG. 10) includes one or more keyboard terminals 10 with associated cash drawers 12 in communication with a control chassis 14 having a micro-computer 16, printer 18 and power supply 20.

The keyboard terminals 10 are adapted for use at a point-of-sale counter window or station and function to record, display and price customer orders as received. In the preferred form of the invention shown and described herein, the system is intended for use in a so-called fast food retail outlet.

As seen from FIGS. 1, 2 and 4, each of the keyboards 10 comprises a generally rectangular casing 22 having a desired number of individually operable keys or buttons 24 provided thereon. The casing 22 is adapted to be positioned on a counter immediately in front of the clerk or operator and between the clerk and a customer on the opposite side of the counter. As shown, the casing 22 is of a type commonly used in desk top calculators. The upper surface 26 of the casing has two oppositely sloping portions 28, 30. The larger portion 28 slopes downwardly toward the operator and contains the keys or buttons 24 operated by the clerk when taking the customer's order. The smaller portion 30 slopes toward the customer, away from the operator, and contains a display window 32 in which is shown the price of the order.

In the embodiment shown in the drawings the keyboard is arranged so as to provide 10 numeral keys 34, 40 item keys 36 and 8 function keys 38. There is an associated display window 40 for each item key and for certain function keys. The particular number of keys and the specific arrangement of the keys on the keyboard may be varied as desired. In the device shown, the numeral keys 34 are arranged in a single row at the operator's left. The item keys 36 are arranged in five rows and occupy the center of the keyboard. The function keys 38 are positioned in a single row at the operator's right. Additionally, a display window 42 is provided above the keyboard facing the operator so that the operator may also see the price of the order when displayed therein. As is more fully described hereafter, the keyboard is constructed and sealed against the entry of spilled drinks, condiments, salt, and other food items.

Each keyboard terminal 10 is associated with a cash drawer 12 that is preferably mounted underneath the counter upon which the keyboard rests. The cash drawer 12 is controlled by the keyboard terminal so that access to the cash drawer is under the control of the keyboard at all times. For the present invention the cash drawer need not be modified from its standard form as the cash drawer serves the same purpose in the present invention as it customarily does in other systems. It is preferred that the cash drawer be magnetically operated, that is, that the cash drawer ordinarily be maintained in its closed condition by an electrically operated magnetic system which is under the control of the point-of-sale system.

The keyboards 10 and their associated cash drawers 12 are each electrically connected to a control chassis 14. In the preferred form of the invention shown in the drawings, two keyboards and cash drawers may be operated off one control chassis. However, the number of keyboards and cash drawers which can be operated from a particular chassis can be varied as desired. For example, each keyboard terminal and its associated cash drawer can be interconnected and arranged to run with only one control chassis provided the control logic capability of the computer utilized in the chassis is sufficient to handle the number of keyboard terminals. Alternatively, the components making up the chassis may be modified. For example, one control chassis may be provided with a printer while additional control chassis may omit this component. In such an arrangement the control chassis not incorporating a printer would be connected to the printer component in the master control chassis so that the information fed into each control chassis could be retrieved in the form of a printout. In any event, it is necesssary that the control chassis arrangement provide the necessary control logic function, printout capability and emergency power supply for the keyboard terminals and cash drawers used in the system.

In the preferred embodiment shown and described herein, the micro-computer 16 is made up of a single chip MOS 8-bit parallel central processor unit that is interfaced with standard semi-conductor memory units of both the random-access and read-only types. These components are combined on a single printed circuit board 44 (FIG. 11) to form a computer assembly capable of performing the functions of a digital computer. The micro-computer works with 8-bit numbers and can add, subtract, perform logic and counting functions on and with these 8-bit numbers or bytes. It is preferred to use the 8008-1 8-bit parallel central processor unit manufactured and sold by Intel Corporation. The features and operation of this central processor unit are described and illustrated in a "User's Manual" entitled "8008 8-bit Parallel Central Processor Unit, MCS-8 Micro-Computer Set" published November 1972 by Intel Corporation. This central processor unit can directly address more than 16,000 bytes of external memory of any kind, such as magnetic core, magnetic drum, or semi-conductor memories. In the preferred embodiment semi-conductor memories of the read-only type 46 (ROM) and random-access type 48 (RAM) are employed. The read-only memory units are employed for program instructions and the random-access units are employed for data storage and certain control functions.

The central processing unit contains internal data registers which are used for counting and operation. The unit also controls the external devices of the present system such as the keyboard terminal readings, printer control and the display windows associated with the item keys. The central processor units requires approximately 12.5 micro-seconds per instruction, which means that it can process in the neighborhood of 80,000 instructions per second.

The printer 18 in the control chassis 14 may be of any suitable commercial type. In the preferred form of the invention shown and described herein the printer is a SEIKO series 101. This model is a two-tape printer with a split drum and there are 10 columns of characters for each tape. The split drum rotates continuously and carries the typeface for printing the desired characters. Printing is effected by pressing the paper tape and character ribbon against the typeface by means of actuating hammers. The hammers are driven by electromagnets powered by transistor amplifiers under the control of the computer. Magnetic pick-ups sense the drum position and inform the computer when the hammer magnets are to be pulsed to print desired figures in the desired columns.

A power supply 20 in the chassis 14 supplied power for all of the circuits. In addition, a storage battery is included in order to maintain the information in the RAM memory units in case of a power failure of limited duration.

OPERATION OF THE KEYBOARD TERMINAL

As seen from the preferred embodiment of the invention shown in the drawings, the manually operable keys are arranged with 10 numeral keys 34 in a single row at the left-hand edge of the keyboard. These keys provide 10 single unit numerals, 0 through 9.

At the center of the keyboard, 40 food item keys 36 are provided in 5 rows of 8. These food item keys 36 are covered with a menu sheet 39 (FIG. 6) that carries abbreviations for a selected group of food items. For example, the position for the first food item key 36 at the upper left corner of the menu sheet bears the abbreviation "HAMB." This stand for the food item — hamburger. The food item key position immediately below bears the abbreviation "CHB." This stands for the foot item — cheeseburger. Other key positions are provided with similar notations to indicate regular and large orders of french fries, regular and large orders of Coke, regular and large orders of an orange drink, regular and large orders of root beer, orders for chocolate, vanilla, or strawberry milkshakes, one-quarter pound hamburgers, one-quarter pound cheeseburgers, fish, apple pie, milk, coffee, and other similar food items. In the menu sheet for the keyboard shown in the drawings, 40 food item keys are provided but, as previously indicated, additional key positions may be provided and arranged as desired. It will also be noted that certain key positions bear no notation. These key positions may be used for special food items that are added after the system is installed. All notations can be changed by store personnel in a simple and easy manner.

The position of each food item key 36 is covered by a colored circle 50 which indicates to the operator the point to press in order to actuate the key. Each food item key 36 is also provided with an associated display device 52. As shown in the accompanying drawings, the display device 52 in the preferred embodiment of the invention comprises a digital numeral display. One particular numeral display device which may be used in the invention comprises seven incandescent lighting strips or bars 54. When the strips 54 are lighted in proper combinations, the device 52 can display the numerals 0 through 9. The display device 52 also incorporates a small dot 56 positioned beneath the numeral display for the indication of numerals in excess of 9.

Other combinations of keys and displays can be used. Keys using a flexible conducting sheet, keys using reed switches or switches with mercury-wetted contacts, keys using metal contacts in air such as leaf-spring or cross-bar switches, keys operated by the movement of magnets or capacity sensitive keys may be used.

Correspondingly there are many types of numerical displays than can be used. These include displays formed of individual lamps, displays using projection of images of numerals, light-emitting diode and liquid-crystal displays and gas discharge displays.

At the right-hand edge of the keyboard 22 a series of function keys 38 are provided. The top three keys are designated "grill 1," "grill 2," and "grill 3." Beneath these keys are additional keys for the following functions: "cancel order"; "clear error"; "no tax" item; "total" and "open drawer." The four function keys, "grill 1," "grill 2," "grill 3," and "no tax" also have associated display devices, however, the display devices do not display digital numerals. The display devices 58 associated with these function keys are merely lights to indicate when the function keys has been actuated. There are no display devices associated with the numeral keys 34 nor with the function keys: "cancel order," "clear error," "total" and "open drawer."

ORDER ENTRY

As previously mentioned, the keyboard 22 is adapted to rest on a counter in front of the clerk and between the clerk and a customer placing an order. As the customer gives the clerk the order, the clerk enters the order by pressing selected key positions on the keyboard terminal. When an item, such as hamburger, is ordered the item is entered by pressing the hamburger key position. This entry mode applies to all food item keys, hence, to enter an order for a hamburger regular french fries, and a vanilla milkshake, the clerk or operator will press the hamburger, regular fries, the vanilla shake food item keys. As each food item key is pressed for the first time, the numeral 1 will appear in the associated display device 52.

Multiple quantities of food items may be entered by the clerk or operator in either of two ways. The clerk may depress the foot item key 36 as many times as the item is ordered. Thus, if the customer wishes 5 hamburgers the clerk may enter 5 hamburgers by pressing the hamburger food item key 5 successive times. As the hamburger food item key is depressed successively, the associated display device will sequentially show the numerals 1, 2, 3, 4, and 5. Alternatively, an order for 5 hamburgers can be entered by first pressing the numeral key 5 and then the hamburger food item key. When these keys are pressed in this sequence the numeral 5 will appear in the associated display window 40 at the time food item key is depressed.

In the preferred form of the invention shown and described herein, the maximum quantity that can be ordered is 15. This is true even though the display device utilized in the preferred embodiment only displays single digit numbers. For quantities 10 to 15 the device displays the second digit in the number as well as a dot 56 beneath the display. The dot signifies a first digit of 1. Thus, the quantity 10 is indicated by the display of the 0 numeral and the lighted dot beneath the display. The quantity 15 is indicated by a display of the numeral 5 with a dot beneath the number. In entering orders for quantities in excess of 9 the clerk first presses the numeral 1 key, then the second digit of the number. A zero quantity is indicated by a black space. The 0 numeral key must be accompanied by the actuation of another number in order to light the display device.

In the above described manner, the clerk enters the quantity and food items selected by the customer until the customer's order is complete. When the order is complete and the customer is ready to pay, the clerk depresses the "open drawer" function key. When the "open drawer" function key is depressed the total price of the customer's order, including tax, is displayed both to the customer and to the clerk and the cash drawer beneath the counter is automatically opened. The clerk may then take the customer's money, make change and close the cash drawer. If the clerk wishes to display the total price of the customer's order but is not yet ready to collect the money, the clerk may alternatively press the "total" function key. Pressing the "total" function key will cause the total price of the customer's order, including tax, to be displayed to the customer and the clerk but the cash drawer will not be opened. At this time, the sale is recorded and the various items incremented to the running totals maintained in the computer memory. When the clerk is ready to collect the customer's money the "open drawer" button is pressed and the cash drawer beneath the keyboard terminal is opened as previously described. When the "total" key is actuated, the sale is recorded by incrementing the appropriate running totals; the audit tape prints the keyboard number (1 or 2 in the preferred embodiment), the amount of tax, the amount of sale including tax; and the display windows 32, 42 display the amount of sale including tax. When the "open drawer" key is actuated without the preceding actuation of the "total" key, a "total" key is internally simulated before the "open drawer" key is acted upon. The result is the same as though a "total" key had been physically actuated before the "open drawer" key. The "open drawer" and "total" function keys will not operate until a food item key is depressed subsequent to the last actuation of the "open drawer" function key. A new order is started by pressing either a quantity key or a foot item key. When this is done, the displays are cleared to black and the cycle starts anew.

ORDER CHANGES

The above description assumes that quantities and food items are entered without change. Provision is made for changes in orders, either because the customer has changed his mind or because the clerk makes a mistake in entering the customer's order. Changes can be made up to the time the "total" or "open drawer" function keys are actuated. No entries are recorded in the computer memory until either the "total" or "open drawer" key is actuated.

If the order change involves increasing the quantity of a food item ordered this may be accomplished either by actuating the food item key again until the additional quantities have been entered, or by first pressing a numeral key corresponding to the new quantity and then again pressing the desired food item key. In either of these ways, additional quantities can be added to the quantities previously ordered.

If it is desired to decrease or decrement the quantity of the previously ordered food item, this can be done by first depressing the correct numeral key and then the proper food item key. This procedure will enter the new decremented quantity for that particular food item. Depression of a numeral key and then a food item key can be used to change the quantity ordered either up or down.

Individual food items may be cancelled without affecting the remainder of the order by depressing the 0 numeral key and then the food item key. The display device associated with the food item will then go black.

The entire order may be cancelled by pressing the "cancel order" function key at the right edge of the keyboard terminal. When this function key is actuated all displays go black and the revised order may then be entered in the manner described above.

ORDER STORAGE AND RECALL

The keyboard terminal has the capability of storing orders for later recall. This capability is desirable if the order includes a food item that will require extra time in preparation. In the present invention, orders may be entered and stored indefinitely without interrupting or interferring with the use of the keyboard for subsequent customer orders.

Once a customer's order is entered on the keyboard in the manner previously described, it may be stored for later recall either before or after payment. If the order is to be stored prior to payment, one of the "grill" function keys is pressed after the order is taken and entered but before the "total" function key is pressed. If no previous order is in storage, the operator will press the "grill 1" function key. When the "grill 1" function key is pressed, the displays for the ordered food items will go black. At the same time, the display light 58 associated with the "grill 1" key will come on to indicate that a food order has been stored in the "grill 1" location.

The keyboard may then be used to take, price and record additional customer orders. These orders may be take and cleared in the normal manner previously described. Several orders may be taken and cleared while the stored order is retained in "grill 1" location. If it becomes necessary to store another order, the operator stores the order by pressing the "grill 2" function key. The associated display light comes on to indicate that there is now a stored order at the "grill 2" location. Inasmuch as there are three order storage function keys, up to three orders may be stored at a time. If desired, additional storage capacity can be provided.

An order may also be stored after payment. In such a case, the order is processed as previously described and the "open drawer" function key is pressed to open the cash drawer. The operator takes the customer's money and places it in the cash drawer. The operator then presses the appropriate "grill" function key to store the order while it is being prepared.

To recall a stored order, the operator presses the appropriate lighted "grill" function key. The associated display light goes out indicating that that particular "grill" location is available for the storage of another order. At the same time, the stored order will be redisplayed by the various food item display devices exactly as it was taken prior to storage. If the order was stored prior to payment, it is completed by the operator as though it has not been stored. Ordinarily, this will only involve the pressing of the "total" or "open drawer" function keys. Additional food items or quantities may be added, however, if necessary. If the order was stored after payment, the total order is again displayed, but the dollar amount which would normally appear in the price display window 32, 42 is replaced by the notation "PPP" indicating that the order has been paid for.

The price of an order cannot be stored and redisplayed. An order can be recalled only if the keyboard has been cleared. If the operator attempts to store an order in one of the "grill" locations where an earlier order is stored, pressing that function key has not effect.

ERROR DISPLAY

The operation sequences described above, as well as certain other sequences described later, constitute "legitimate" sequences which the computer is programmed to recognize. Any other sequences are "illegitimate" and are not recognized by the computer. Illegitimate sequences resulting from error or unfamiliarity with the operation of the keyboard terminal are indicated by the display of the notation "EEE" in the order price display window 42. For example, if the operator attempts to store an unpaid order after pressing the "total" key, the error display "EEE" will appear since this is an illegitimate sequence. The order will not be stored.

When the operator sees the error display, he or she is informed that an illegitimate sequence has been attempted and the desired operation has not been carried out. The error display condition can be corrected in either of two ways. The operator may press the "order cancel" function key to clear all displays to black. This clears the keyboard terminal for any legitimate sequence. Alternatively, the operator may press the "clear error" function key. This cancels the attempted illegitimate sequence without clearing any of the previous legitimate sequences. The keyboard is then returned to the same condition it was in immediately prior to the attempted sequence. Additional entries and sequences may then be performed as though the erroneous function has never been tried.

MANAGERIAL FUNCTIONS

The control chassis 14 for the point-of-sale system is adapted to permit a number of managerial functions to be performed on random occasions as desired. For the most part, these manager functions involve the printout of various data accumulated and stored in the computer. Provision is also made for correcting cash drawer errors and changing both prices and the automatic tax computation.

For these purposes the control chassis 14 is provided with a control switch 60. Accesss to the panel is limited to the manager by a multiposition key switch which is operable solely by a special key in the possession of the manager. Insertion of the key into the switch 60 is necessary to move the switch to the various control positions.

Five control positions of the keyswitch 60 are provided in the preferred embodiment of the invention, shown and described herein. These positions are designated "Manager," "Normal," "Correction 1," "Correction 2" and "Standby." When the system is in use the keyswitch is turned to the "Normal" position. In this position the system is connected to the power supply of the store and power is supplied to the keyboard terminals, the computer, the printer and the cash drawers. When the store is closed the keyswitch is turned to the "Standby" position. This cuts off all power to the system except for the computer to which power is always maintained. Moving the keyswitch out of "Standby" restarts the computer program at address OOO OOO.

The manager's key may be removed when the switch is in either the "Normal" or "Standby" positions, but may not be removed when the switch 60 is turned to the other switch positions.

ERROR CORRECTIONS

Provision is made for the correction of erroneous entries on the part of keyboard operators. Erroneous entries can be deleted when the manager's control switch is turned to the appropriate correction position. A correction switch position is provided for each keyboard terminal connected to the control chassis. To make a correction the manager inserts his key into the control switch 60 and turns the switch to the proper keyboard correction position. In this position the key cannot be removed from the switch. "Cor" is displayed in the price display window 32, 42 of the keyboard terminal. The order to be corrected must be displayed on the keyboard. Pressing the "8" and then "9" numeral keys automatically corrects the cumulative data in the computer since the incorrect amount is subtracted from each of the individual items being totalled by the computer. Corrections also appear on computer printouts with a minus sign. A cumulative corrected sales value is maintained and this total is adjusted every time a correction is made.

Since the key cannot be removed from the switch 60 in any of the correction positions, the switch must be returned to the "Normal" position before the manager can retrieve his key. This procedure guards against the chance the control chassis will inadvertently be left in an inappropriate operating condition.

DATA MODE

A data mode switch location is provided which the manager may use to retrieve data stored in the computer, to clear certain registers and to change the price and automatic tax computation functions of the keyboard terminals. Each of these operations is initiated by a particular submode programmed into the computer and carried out at the keyboard terminals. Initiation of these submodes is effected by turning the manager's key to the "Manager" switch position and then by pressing selected terminal keys. To obtain an hourly report the "grill 1" function key is pressed. This puts the keyboard into an hourly report submode and the letters "Hly" are displayed in the price display window. To obtain a daily report submode the "grill 2" function key is depressed. The display window 42 will show the letters "dLY." To obtain the produce mix submode the "grill 3" function key is actuated. This action causes the letters "Pro" to appear in the price display window. When the desired submode is obtained, the designated report is printed by pressing the "total" key. The report is cleared by use of the "open drawer" key.

The hourly report gives the total gross sales and the total net transactions which have occurred since the last hourly report was taken. The daily report gives the gross sales, non-taxed sales, tax collected and customer count for each keyboard since the last clearing operation. It also shows the prior year-to-date gross sales, the prior year-to-date tax collected, the prior year-to-date non-taxed sales and the number of manager deletions for the keyboards. The produce mix report shows the quantity of each item sold since the last clearing operation was performed.

PRICE CHANGE

The "Manager" position is also used to make price and tax changes. To make a price change the keyswitch is turned to the "Manager" position. Thereafter, the "spcl. 3" food item key is pressed to place the keyboard in the price change mode. The display will show "PCh" to indicate that the keyboard is in the price change mode.

Entry of a new price is accomplished by pressing the proper quantity keys and then the food item key representing the item being changed. When this is done the new price will appear in the total price display window 42 and, at the same time, the letter "P" will appear in the display device 52 associated with that food item key. To read the old price being changed prior to entry of the new price, the particular food item key is pressed before the new price is entered through the quantity keys.

If the item being changed was a no tax item, the "no tax" function key display device will light up. If it was a taxed item but is to be changed to a no tax item the "no tax" function key will not be lighted. If it is then pressed, the key will light and the item will be entered as a no tax item when the price is changed. If the change is the opposite, that is, from a no tax status to a taxable item, the "no tax" function key will light up. To change the tax status the "no tax" function key is pressed. The lighted key will go dark and the item will then be entered as a taxable item when the new price is entered.

A printout of the food item prices can be obtained any time during the price change mode by pressing the "total" function key. Any price changes will be indicated by the letter "c." To leave the price change mode, the manager presses the "cancel order" function key. This causes the prices to be printed if a change were made.

TAX CHANGE

To enter a change in the automatic tax computation function, the manager's keyswitch is first turned to the "Manager" position. The "no tax" function key in the keyboard terminal is then pressed to put the keyboard into the tax change mode. This is indicated in the price display window 42 which displays the letter "tCh". When the keyboard goes into the tax change mode, the visual display devices associated with the first fifteen food item keys will show the numbers 1 through 15 in sequence. At the same time, the letter "r" will appear in the top display device in the center row of the keyboard and the letter "d" will appear just below it.

To set the initial tax bracket, whatever it may be, the manager enters the lowest amount upon which the tax is one cent. To do this, the manager enters the amount by pressing the proper numeral keys at the left of the keyboard. He then presses the food item key opposite the display device showing the numeral 1. The lowest tax bracket amount figure will then appear in the total price display window and the numeral 1 will be displayed opposite the food item key at the upper right corner of the keyboard. This display informs the manager as to which tax bracket is being displayed. This procedure is then repeated for the other 14 tax brackets.

The lowest taxable amount for any tax bracket can be displayed without change by simply pressing the appropriate food item key. In such a case, the amount will be displayed in the total price display window. Hence, by first displaying the amount in this manner and then comparing it against the applicable tax table or chart, the proper tax computation function for the store can be visually checked by the manager. If the taxable amount for any particular bracket needs to be changed, it may be done in the manner described.

To set the applicable tax above the 15th bracket, the manager enters the tax on $4.00 by pressing the proper numeral quantity keys. He then presses the food item key opposite the display with the letter "r. " The manager next enters the lowest amount of the next tax bracket above $4.00 by using the quantity keys and by then pressing the food item key opposite the display with the letter "d."

Entry of these items into the computer enables the computer to apply the proper tax computation for almost every tax jurisdiction in the United States. It has been found that existing tax structures above $2.54, or the lowest taxable amount in the 15th bracket, whichever is less, apply the authorized tax rate calculated to the nearest ¼ of 1 per cent in one of three ways.

1. In one method, the tax on whole dollars is calculated by application of the tax rate. The tax on any remaining fraction of a dollar is determined according to the particular tax bracket breakdown between $1.00 and $2.00, minus the amount of tax on $1.00.

2. In another method, the tax is calculated according to the authorized rate and, when the result is a fraction, always rounds up to the next whole cent.

3. In the third method, the tax is calculated by applying the authorized rate but when the result is a fraction, the tax is rounded, up or down, to the nearest whole cent.

Entering the tax on $4.00 determines the authorized tax rate. Since the tax rate is calculated to the nearest ¼ of 1 per cent, the use of $4.00 will always determine the rate to the necessary accuracy.

Entry of the next lowest tax bracket amount above $4.00 determines which of the three methods of application is being used. If that amount is $4.01, this identifies the second method—one where the fractional tax is always rounded up to the next whole cent. If the amount is equal to $4.00 plus the quotient of 0.5 divided by the tax rate expressed as a percentage, or equal to that amount rounded up to the next whole cent, the method being used is the third method. If the amount of the tax bracket about $4.00 does not indicate either the second or third method then by the process of elimination, the first method is being used.

In this way, the computer is able to identify the tax method used with respect to amounts over $2.00 and can apply whichever method is indicated. By reason of this capability, the present point-of-sale system can be used without modification almost anywhere in the United States. This is an important feature for chain or franchise operations that are nationwide in scope. However, in the particular embodiment of the invention shown and described herein, the computer is programmed only for the second method—the round up method.

A printout of the tax table can be obtained any time during the tax change mode by pressing the "total" function key. Any tax bracket changes will be indicated by the letter "c."

To leave the tax change mode, the manager presses the "cancel order" function key. This causes the tax table to be printed if a change were made.

CONSTRUCTION OF KEYBOARD TERMINALS

Each keyboard terminal consists of a stainless steel casing or housing 22 of the type normally utilized in desk top calculators. The casing 22 has sides 62 and a top 64 but no bottom. All corners and edges are rounded. The upper surface 26 of the housing 22 is inclined in two directions. One inclined surface 28, the greater of the two, inclines downwardly, toward the operator. The other inclined surface 30 slopes in an opposite direction, toward the customer. The front, back and sides of the casing are generally vertically disposed. There are three openings in the upper inclined surfaces of the housing. One opening 66 is located in the inclined surface facing the customer. This opening accommodates a total price display device 32 and forms therewith a window wherein the customer can observe the price of his order. A similar opening 68 is formed at the upper or outer edge of the surface 28 sloping toward the operator. This opening likewise accommodates a visual display unit 42 which operates concurrently with the first display device to simultaneously display the price of the order to the keyboard operator. Additionally, the keyboard housing has a large rectangular opening 70 which accommodates the various keys and their associated visual display devices.

The keyboard construction, in the preferred embodiment of the invention shown in the drawings, comprises a three-tiered assembly adopted to fit within and underneath the rectangular opening 70 in the housing 22. The lower and middle tiers comprise printed circuit boards 72, 74 connected together in parallel spaced relationship by screws 76 and cylindrical posts or spacers 78. Rectangular bars 80 formed from an electrical insulating material are mounted along the peripheral edges of the upper surface of the upper printed circuit board 72. The bars 80 locate the keyboard assembly relative to the housing 22 by bearing against the under surfaces of the housing 22 defining the rectangular opening 70. A sponge rubber gasket 82 is placed between the housing 22 and the bars 80 to effect a liquid-tight seal that protects the keyboard assembly against penetration by spilled beverages.

The third, or uppermost, tier 84 of the keyboard assembly comprises the switches and the display devices for the keyboard as well as the covering sheets which protect and identify them. There is a switch 34, 36, 38 for each key in the keyboard and for most of the keys there is an associated display device 52. The particular form of the switches and display devices is not of critical importance since many different types may be used. As previously explained the keyboard in the preferred embodiment contains ten numeral keys, forty food item keys and eight function keys. There is an associated display device 52 for each of the food item keys 36. These display devices are adapted to display the numerals 0 through 15 and also certain letters. In the form of the invention shown and described herein, the switches employed are of the snap-action type. These switches comprise circular metallic disks that are normally bowed upwardly. Downward pressure on the disk, however, brings the center of the disk into engagement with electrical contacts to complete a circuit and generate an identifying signal specific to that particular key. Removal of the pressure causes the disk to snap upwardly to its normal bowed condition and interrupts the engagement with the contact. As shown, the switches 34, 36, 38 for the keys are mounted in longitudinal strips on narrow printed circuit boards 88. There is a strip of switches for each row of keys. The strips are fastened to the upper printed circuit board 72 in spaced relationship by means of screws 90 and spacing posts 92.

Immediately adjacent the switches are the visual display devices 52. The display device utilized in the preferred embodiment of the invention employs seven separate incandescent lighting filaments which can be selectively lighted to form the numerals 0 through 9 (FIG. 9). Each display device is a separate unit and is inserted into a socket strip 94 soldered to the upper surface of the upper printed circuit board 72. Additional display devices 52 are mounted on the upper printed circuit board beneath the operator's price display window 42. Similarly, still other display devices 52 are mounted upon another printed circuit board 96 positioned below the customer's price display window 32. This display device is sealed against the entry of liquids in the same way as the operator's keyboard.

The keyboard is covered with three layers of plastic sheeting (not shown) so as to present a smooth wear surface to the operator. A clear plastic sheet forms the bottom layer and an intermediate plastic menu sheet is positioned over this. The intermediate menu sheet 39 is a translucent white with clear window portions 40 positioned over the display devices 52. Printed legends for the identification of the various keys are carried by the menu sheet. Yellow circles 50 are also placed on the menu sheet. These circles overlie the snap-action switches and serve to locate for the operator the operable switch portion of each key. A top sheet of a clear, tough plastic is provided over the menu sheet to take the wear from the operator's use of the keyboard.

The keyboard assembly is secured to a closure plate 98 for the bottom of the terminal housing 22. The closure plate is arranged so as to permit the keyboard assembly to be dropped a short distance downwardly away from the housing to permit the changing or replacement of the protective covering sheets of plastic.

INTERROGATION OF THE KEYBOARD TERMINALS AND COMPUTER OPERATION OF THE ASSOCIATED DISPLAY DEVICES

The central processor unit and its associated memory banks are programmed to handle several uses on an allocation basis. Allocation is accomplished in a manner which permits the simultaneous use of two keyboards and a printer without any noticeable delay in the functioning of the individual units being served. Thus, the central processor unit and memory banks function to sense key actuations on both keyboards, light all display devices as required, operate the printer and perform all calculations and other logic sequences called for by the keyboard operators and/or store manager, without causing any noticeable delays at the printer or either keyboard.

To accomplish this, the computer is programmed to service the keyboards and the printer on a time-sharing basis. Because of the necessity of servicing the keyboards and printer separately, the operation of the computer consists in continuous repetitions of the cycle shown in FIG. 3. That cycle consists of a first scanning sequence 100 having two phases; a first phase in which the keys and display devices of keyboard 1 are scanned, and a second phase in which the keys and display devices of keyboard 2 are scanned. After the scanning sequence 100 is completed the computer next carries out a processing step 102 in which various logic sequences for keyboard 1 are done as required. The processing step 102 is followed by a second scanning sequence 104 just like the first in which the keys and display devices of keyboard 1 are scanned and then the keys and display devices of keyboard 2 are scanned. This second scanning sequence is then followed by a second processing step 106 in which logic sequences for keyboard 2 are performed. A third scanning sequence 108 follows and, again, the keys and display devices of the two keyboards are scanned. In the final step of the cycle, the computer executes a printing operation 110 in which any demands for the printer are satisfied. At the end of the printing operation, the computer starts on a repetition of the cycle by initiating another scanning sequence 100. A complete cycle of operations is made 213 times a second. One scanning sequence and the following process or printing step occurs 640 times a second. A scanning sequence lasts approximately 0.975 milliseconds and a processing or printing operation lasts approximately 0.525 milliseconds.

As shown in FIG. 9, the lighting displays used in the preferred embodiment of the invention consist of seven separate incandescent strips, or bars 54, which can be selectively lighted to form the numerals 0 through 9. There is also a dot 56 at the bottom of the device which is used to indicate a number greater than 9. For example, the dot 56 is lighted with the strips or bars 54 defining the numeral 1 whenever the numeral 11 is intended. Any or all of the eight display elements may be selectively lighted to thereby form a visual display of any desired numeral up to 15. The strips or bars 54 may also be selectively lighted to form certain letters.

The keys and their associated display devices are identified and located for the computer by means of three sets of letter coordinates (see FIG. 7). Each of the keys has an X coordinate and a Z coordinate. There are 16 X coordinates starting with $X_0$ and ending with $X_{15}$. There are 4 Z coordinates, $Z_1$ through $Z_4$. For the display devices, there are 16 X coordinates and 3 Y coordinates. Each Y coordinate is further divided into eight separate segments identified by the letters $a, b, c, d, e, f, g$, and $t$. These letter segments are keyed to the seven incandescent strips 54 and dot 56 making up the individual display devices 52.

Scanning of the keys of a keyboard and the lighting of the associated display devices is initiated by an output signal from the computer to the keyboard. The computer output signal carries 32 bits of data which serve to interrogate the keyboard and to designate which display devices are to be lighted. The first 24 data bits are used to carry the instructions designating the Y coordinates and the letter segments of the display devices that are to be lighted. The next four data bits (through the use of a 4 to 16 decoder) designate one of the 16 X coordinates. This designated X coordinate then serves to identify the keys being interrogated by the computer on each output signal as well as the particular display devices to be lighted in response to previously sensed key actuations. The final four data bits of the output signal are blank so that the keyboard may impress upon these data positions the Z coordinate of any key being actuated by the keyboard operator.

From the computer, the output signal passes in steps through seven TTL shift registers 112 (FIGS. 8A and 8B) and is then returned to the computer. The first 8 data bits, or byte, will carry the $Y_1$ coordinates for those display devices identified by a $Y_1$ coordinate. If no $Y_1$ display devices are to be lighted all 8 data bits will have a zero voltage. Since a positive voltage is required to designate a particular display device, 8 blank data bits will pass through the shift registers 112 and return to the computer without turning on any display devices.

If one or more of the first 8 data bits have been impressed with a positive voltage, that voltage will serve as an instruction that a display device having a $Y_1$ coordinate is to be lighted. Which $Y_1$ display device is to be lighted will not be known until the X coordinate is also identified. The X coordinate will be identified by the first 4 bits of the last 8 bit byte of the computer output signal. At the time the $Y_1$ coordinate instruction is given to the keyboard, the particular letter segments required to light the necessary strips or dot of the designated display device are also given.

The second 8 data bits, or byte, of the computer output signal carries the designating instruction for all display devices having a $Y_2$ coordinate. Similarly, the third set of 8 data bits of the output signal carries the designating instruction for all display devices having a $Y_3$ coordinate. As mentioned above, the next 4 bits carries the instruction which will supply the X coordinate necessary to identify the display devices to be lighted and the particular keys to be interrogated. These 4 bits of data are fed into a 4 to 16 decoder 114 so that one of the 16 X coordinates is designated by each computer output signal. The first output signal of 32 bits will designate the $X_0$ coordinate. There are three display devices that have this X coordinate. They are the devices having the coordinates $X_0Y_1$, $X_0Y_2$ and $X_0Y_3$. If any of the three Y coordinates are also designated, the devices so identified will be lighted. The maximum number of display devices that can be lighted by one output signal from the computer is three.

The sixteen output lines from the decoder 114 are not only connected to the matrix 116 of the pin sockets 118 for the display devices 52, but are also connected to the matrix 120 of pin sockets 122 for the keys on the keyboard terminal. The designated X coordinate, in addition to identifying the display devices to be lighted, also identifies the particular keys to be interrogated. Since there are four keys with the same X coordinate, each output signal from the computer serves to interrogate four keys. As described earlier, there are 640 scanning sequences for each keyboard per second. It takes sixteen scans (sixteen computer output signals) to interrogate all keys (coordinates $X_0$ through $X_{15}$). A complete interrogation of all of the keys in a keyboard is completed in 1/40th of a second. This is a sufficiently short time to insure that all depressions of the keys will be detected.

When a key is depressed, a circuit is completed which impresses an input signal on the last four data bits of the computer output signal. If, for example, the operator presses the hamburger key, a circuit is completed between points 9 and 3 on the pin socket 2A (FIG. 7). Completion of this circuit sends a positive pulse through line 5 (FIG. 8A) to shift register 6B. This pulse impresses a positive voltage in the position of the 32nd data bit, thereby identifying the coordinate, $Z_4$. When the output signal returns to the computer, the locating coordinates $X_0Z_4$ are sensed and the computer knows that the "hamburger" key has been actuated. It will then send out an instruction to light the associated display device, $X_0Y_1$, the next time the computer sends out an $X_0$ output signal.

With the make up of the keyboard shown in the drawings, there are 40 logical display devices for the food item keys, an additional 4 logical display devices for the price display and 4 simple, single element lightbulbs 58, making a total of 48 display devices. Inasmuch as three displays can be lighted during each scanning phase, only 16 scans are required to cover all displays. In one second, any particular display device will be lighted 40 separate times since there are 640 available scanning phases per keyboard per second. This lighting frequency is fast enough to make the display appear continuous to the human eye without any objectionable flicker.

During each scanning sequence four keys can be interrogated. In 16 scans a total of 64 keys will be interrogated. There are 40 food item keys, 8 function keys and 10 numeral keys in the keyboard shown in the drawings. Accordingly, each key on the keyboard is interrogated in every 16 scans or, to put it another way, 45 times a second.

The computer output signal imparts instructions to the keyboard for lighting the display devices and receives data on the Z coordinate of depressed keys only when the 32 data bits are located in the proper shift registers 112. A transfer of information occurs only when the first 8 bit byte is in the position corresponding to the $Y_1$ connections from the display matrix (FIG. 8B). At the same time, the next 8 bits of data will be aligned with the $Y_2$ connections and the third 8 bit byte aligned with the $Y_3$ connections. The next 4 bits of data, carrying the determining X coordinate for both the displays and the keys, will be in shift register 4B (FIG. 8A) which is interconnected with the 4 to 16 decoder 4C. The final 4 blank data bits will be in register 6B ready to receive an output signal in the event an interrogated key has been depressed. With the computer output signal so positioned, the "one shot" circuit 124 is actuated and the information carried by the signal is communicated to the keyboard and any input from the keyboard is impressed upon the last four blank data bits. The signal then is shifted in steps through the shift registers 112 to the computer. The next following signal, bearing its instructions and determining X coordinate, follows behind. Its information will not be released to the keyboard, however, until the signal is properly aligned as described above. When so aligned, the "one shot" circuit 124 will be energized again and another transfer of instructions effected.

An enabling circuit 126 is provided to protect the display devices 52. Since the incandescent strips or bars 54 are lighted intermittently, a higher voltage is impressed upon them to compensate for a decay in brightness during the unlighted periods. Should movement of the computer output signal through the shift registers 112 be interrupted and a signal left in the actuating position, the lights could be burned out. Accordingly, the enabling circuit clears the registers 112 in such an event to protect the display lights.

It should be noted that the X coordinates for the keys are not necessarily the same as the X coordinates for the display devices. The hamburger key used as an example herein happens to have the same X coordinate as its associated display device. However, the X coordinates for the remaining keys are, for the most part, different from the X coordinates for their associated display devices.

All pin sockets for keys having the same coordinates are interconnected in parallel. Thus, contact 9 on pin socket 2A, having the coordinate $X_0$, is connected in parallel to point 11 on socket 1A, point 10 on socket 6A, point 16 on socket PG 3 and point 4 on socket 4A.

Actuation of the food item and numeral keys calls for the lighting of the associated display devices. When the computer receives a signal that a food item key has been depressed, it first looks to see if more than one key has been depressed at the same time. If so, the computer lights the error display. If only one key has been depressed the computer next looks to see if a numeral key has been depressed. If one has been actuated, the display device associated with the food item lights the number corresponding to the particular numeral key actuated. If the next preceding key actuation was not a numeral key, the pressing of the food item key will cause the quantity for that food item to be incremented by one. As explained previously, any quantity of a particular food item can be incremented by use of the numeral key corresponding to the new desired quantity followed by actuation of the food item key. Alternatively, the quantity can be incremented sequentially through repetitive actuations of the food item key. Decrementing can be accomplished only by going to a lower quantity numeral key and then actuating the food item key. A particular food item can be cancelled completely by pushing the zero numeral key and then the food item key.

COMPUTER PROCESSING STEPS

Each scanning sequence of the computer is followed with either a processing step or a printing step. In the processing steps, the computer carries out the logic sequences called for by the keyboard terminals. The time elapse for each processing step is 0.525 milliseconds and, in this time period, the computer can pass through 210 states.

Many of the operations involved in the processing step can be accomplished in 210 states or less, but the more complicated operations, such as the total price calculation, require many more states. In such cases, the processing operation has to be carried out over a number of processing steps. This means that an operation once begun is interrupted by further scanning sequences, by the processing step for the other keyboard and by the printing step. The program for the computer is designed to allow this interruption of the processing operation and is, accordingly, divided into separate parts called quanta. Each quantum is a part of the program operation that can be accomplished within 210 states. Each quantum must be self-contained so at its conclusion, no information is left in the central processor unit. The start of the next succeeding quantum in the operation must be set up so that the operation can be picked up and continued during the next processing step for that keyboard.

To do this, three reference points or locations are provided in the random access memory. One location is provided for the first keyboard processing step, another location is provided for the second keyboard processing step and a third location is provided for the printing operation. At the end of the first scanning sequence — the one preceding the process step for keyboard 1 — the computer is instructed to jump to the reference point, or location, for keyboard 1. The information stored at this address will tell the computer what it is to do next. If, during the previous processing step, a logic sequence was completed and there is no pending operation, the computer will be free to start on a new demand should one be called for. However, if the operation in the last processing step was not completed, an instruction to carry on with another part or quantum of the operation would have been left in the random access memory and the computer will be told to initiate the next quantum in the operation. In the same way, the reference locations for the other keyboard processing step and the printing operation are programmed to either carry on with their respective operations or to tell the computer to start upon another processing or printing operation.

To carry out the computer program, additional read-only memory is required over that provided for on the printed circuit board of the central processor unit. Accordingly, nine additional ROM units 128 were mounted at the left side of the printed circuit board 44 (FIG. 11).

During idle periods, the processor compares three identical copies of the price and tax tables, correcting any discrepancies that arise by majority logic. A cumulative count of detected errors is maintained and printed with the hourly report.

The complete computer program is set forth in Appendix 1 and the various internal processor operating instructions of the central processor unit are set out in Appendix II.

APPENDIX I

Program Legend

```
XXX  OOO           DDD: DDD:
XXX  O1O           DDD: DDD:
XXX  3 7O          DDD: DDD:
 ROM No.            Contents
 Address
```

The octal content ( DDD ) of ROM XXX from octal address OOO to address 377 is listed from left to right and top to bottom. Each data word is terminated by a colon ( : ). The address of only the first data word in each row is provided.

```
000 000    250: 131: 131: 007: 000: 000: 000: 000:
000 010    056: 010: 066: 374: 036: 104: 373: 060:
000 020    076: 020: 060: 076: 003: 056: 012: 005:
000 030    127: 106: 240: 015: 066: 277: 056: 012:
000 040    076: 002: 050: 076: 002: 066: 377: 046:
```

| | |
|---|---|
| 000 050 | 154: 374: 051: 374: 066: 372: 040: 374: |
| 000 060 | 050: 374: 066: 374: 373: 051: 373: 106: |
| 000 070 | 000: 002: 300: 106: 000: 002: 066: 056: |
| 000 100 | 375: 104: 111: 002: 066: 372: 367: 346: |
| 000 110 | 111: 044: 160: 074: 160: 150: 274: 004: |
| 000 120 | 300: 300: 006: 100: 277: 036: 003: 110: |
| 000 130 | 276: 004: 076: 040: 300: 066: 274: 370: |
| 000 140 | 304: 024: 005: 066: 357: 370: 066: 375: |
| 000 150 | 076: 155: 104: 007: 002: 250: 066: 370: |
| 000 160 | 046: 010: 061: 370: 041: 110: 162: 000: |
| 000 170 | 066: 256: 076: 365: 066: 156: 076: 021: |
| 000 200 | 066: 375: 076: 207: 104: 013: 002: 066: |
| 000 210 | 357: 317: 006: 077: 241: 150: 260: 000: |
| 000 220 | 011: 371: 361: 317: 066: 356: 371: 104: |
| 000 230 | 245: 022: 056: 001: 317: 354: 066: 362: |
| 000 240 | 371: 061: 076: 000: 066: 375: 076: 024: |
| 000 250 | 060: 076: 007: 036: 004: 104: 007: 002: |
| 000 260 | 066: 375: 076: 117: 036: 010: 104: 007: |
| 000 270 | 002: 066: 372: 367: 307: 074: 040: 150: |
| 000 300 | 316: 000: 106: 226: 005: 066: 375: 076: |
| 000 310 | 104: 036: 002: 104: 007: 002: 076: 020: |
| 000 320 | 066: 160: 307: 260: 120: 340: 000: 066: |
| 000 330 | 375: 076: 320: 036: 011: 104: 007: 002: |
| 000 340 | 310: 305: 004: 005: 002: 044: 360: 076: |
| 000 350 | 200: 060: 370: 060: 371: 060: 371: 036: |
| 000 360 | 002: 104: 270: 002: 036: 004: 066: 375: |
| 000 370 | 076: 023: 060: 076: 016: 104: 007: 002: |
| 001 000 | 000: 017: 036: 004: 023: 042: 013: 032: |
| 001 010 | 003: 022: 041: 007: 026: 045: 016: 035: |
| 001 020 | 006: 025: 044: 012: 031: 002: 021: 040: |
| 001 030 | 011: 030: 047: 015: 034: 005: 024: 043: |
| 001 040 | 014: 033: 001: 020: 037: 010: 027: 046: |
| 001 050 | 066: 360: 076: 030: 066: 362: 076: 000: |
| 001 060 | 066: 375: 076: 072: 060: 076: 001: 104: |
| 001 070 | 366: 001: 066: 360: 347: 041: 374: 160: |
| 001 100 | 112: 001: 066: 365: 106: 310: 006: 104: |
| 001 110 | 013: 002: 060: 307: 074: 012: 150: 177: |
| 001 120 | 001: 066: 155: 307: 066: 375: 370: 036: |
| 001 130 | 010: 104: 007: 002: 066: 156: 076: 163: |
| 001 140 | 036: 006: 104: 050: 001: 104: 246: 014: |
| 001 150 | 010: 371: 036: 007: 110: 165: 001: 061: |
| 001 160 | 317: 010: 371: 036: 011: 066: 375: 076: |
| 001 170 | 040: 060: 076: 006: 104: 007: 002: 060: |
| 001 200 | 307: 066: 256: 367: 370: 061: 306: 066: |
| 001 210 | 256: 370: 066: 365: 307: 061: 267: 061: |
| 001 220 | 267: 110: 050: 001: 066: 156: 307: 066: |
| 001 230 | 375: 370: 104: 013: 002: 066: 156: 076: |
| 001 240 | 257: 066: 367: 317: 061: 327: 061: 371: |
| 001 250 | 061: 372: 066: 173: 104: 243: 061: 066: |
| 001 260 | 163: 076: 100: 061: 076: 100: 061: 076: |
| 001 270 | 213: 061: 076: 200: 066: 356: 076: 174: |
| 001 300 | 066: 375: 076: 311: 036: 005: 104: 007: |
| 001 310 | 002: 066: 356: 307: 024: 001: 370: 074: |
| 001 320 | 170: 036: 013: 160: 000: 002: 360: 024: |
| 001 330 | 120: 330: 307: 260: 110: 341: 001: 006: |
| 001 340 | 012: 074: 215: 110: 347: 001: 250: 360: |
| 001 350 | 345: 056: 003: 307: 044: 177: 363: 354: |
| 001 360 | 370: 036: 002: 104: 007: 002: 030: 104: |
| 001 370 | 007: 002: 325: 302: 324: 322: 322: 377: |
| 002 000 | 066: 375: 076: 262: 060: 076: 024: 031: |
| 002 010 | 110: 007: 002: 056: 013: 066: 057: 105: |
| 002 020 | 074: 020: 102: 077: 002: 051: 103: 074: |
| 002 030 | 020: 102: 077: 002: 061: 307: 004: 001: |
| 002 040 | 044: 017: 370: 310: 002: 201: 360: 307: |
| 002 050 | 123: 060: 307: 123: 060: 307: 123: 301: |
| 002 060 | 123: 061: 061: 050: 307: 125: 060: 307: |
| 002 070 | 125: 060: 307: 125: 301: 125: 007: 277: |
| 002 100 | 053: 317: 370: 301: 260: 053: 076: 377: |
| 002 110 | 007: 106: 374: 010: 051: 136: 374: 012: |
| 002 120 | 300: 106: 374: 013: 104: 111: 002: 036: |
| 002 130 | 003: 110: 276: 004: 066: 372: 000: 000: |
| 002 140 | 066: 375: 076: 000: 104: 372: 000: 000: |
| 002 150 | 030: 104: 270: 002: 000: 066: 057: 307: |
| 002 160 | 076: 000: 066: 364: 370: 320: 044: 017: |

| | |
|---|---|
| 002 170 | 310: 252: 170: 127: 002: 044: 160: 074: |
| 002 200 | 100: 110: 206: 002: 054: 160: 261: 066: |
| 002 210 | 276: 277: 150: 150: 002: 370: 066: 375: |
| 002 220 | 076: 227: 036: 005: 104: 007: 002: 066: |
| 002 230 | 276: 307: 002: 024: 120: 016: 020: 271: |
| 002 240 | 140: 244: 002: 301: 004: 356: 345: 060: |
| 002 250 | 357: 360: 317: 060: 327: 066: 375: 354: |
| 002 260 | 371: 060: 372: 036: 004: 104: 007: 002: |
| 002 270 | 066: 365: 076: 006: 066: 375: 076: 306: |
| 002 300 | 060: 076: 002: 104: 007: 002: 066: 365: |
| 002 310 | 347: 041: 036: 012: 150: 000: 002: 374: |
| 002 320 | 104: 007: 002: 307: 060: 317: 060: 327: |
| 002 330 | 060: 337: 354: 066: 367: 367: 370: 060: |
| 002 340 | 371: 060: 372: 060: 373: 007: 000: 117: |
| 002 350 | 117: 117: 000: 147: 147: 147: 000: 004: |
| 002 360 | 000: 004: 072: 005: 000: 004: 000: 005: |
| 002 370 | 044: 005: 104: 000: 271: 000: 153: 005: |
| 003 000 | 000: 060: 155: 171: 063: 133: 037: 160: |
| 003 010 | 177: 163: 376: 260: 355: 371: 263: 333: |
| 003 020 | 066: 056: 307: 054: 001: 370: 350: 066: |
| 003 030 | 160: 307: 260: 110: 125: 024: 036: 010: |
| 003 040 | 104: 007: 002: 066: 177: 076: 020: 061: |
| 003 050 | 076: 171: 106: 324: 003: 076: 064: 036: |
| 003 060 | 006: 104: 007: 002: 066: 056: 357: 066: |
| 003 070 | 176: 347: 060: 327: 302: 054: 200: 150: |
| 003 100 | 152: 003: 370: 160: 141: 003: 012: 370: |
| 003 110 | 061: 040: 374: 304: 024: 006: 340: 006: |
| 003 120 | 001: 255: 330: 006: 060: 364: 207: 360: |
| 003 130 | 302: 353: 267: 370: 036: 001: 104: 007: |
| 003 140 | 002: 036: 002: 106: 331: 003: 335: 104: |
| 003 150 | 123: 003: 066: 176: 076: 057: 106: 324: |
| 003 160 | 003: 076: 170: 036: 007: 104: 007: 002: |
| 003 170 | 066: 056: 357: 066: 176: 317: 301: 074: |
| 003 200 | 077: 100: 253: 003: 010: 111: 251: 044: |
| 003 210 | 217: 150: 221: 003: 036: 007: 104: 007: |
| 003 220 | 002: 371: 066: 163: 327: 061: 337: 361: |
| 003 230 | 307: 076: 000: 262: 131: 006: 001: 255: |
| 003 240 | 350: 307: 076: 000: 263: 131: 036: 002: |
| 003 250 | 104: 007: 002: 111: 044: 017: 150: 273: |
| 003 260 | 003: 024: 002: 150: 304: 003: 036: 007: |
| 003 270 | 104: 007: 002: 066: 161: 307: 127: 036: |
| 003 300 | 007: 104: 007: 002: 066: 160: 307: 076: |
| 003 310 | 000: 127: 106: 324: 003: 076: 020: 036: |
| 003 320 | 003: 104: 007: 002: 056: 010: 066: 375: |
| 003 330 | 007: 031: 110: 331: 003: 007: 306: 044: |
| 003 340 | 077: 367: 345: 056: 003: 317: 354: 360: |
| 003 350 | 371: 007: 000: 066: 361: 307: 024: 001: |
| 003 360 | 370: 061: 277: 360: 007: 000: 001: 000: |
| 003 370 | 066: 372: 367: 317: 241: 007: 000: 002: |
| 004 000 | 066: 276: 307: 024: 047: 320: 066: 055: |
| 004 010 | 336: 247: 150: 213: 004: 006: 370: 106: |
| 004 020 | 370: 003: 110: 274: 004: 363: 307: 252: |
| 004 030 | 370: 006: 367: 202: 310: 066: 377: 307: |
| 004 040 | 012: 012: 361: 267: 066: 377: 370: 066: |
| 004 050 | 375: 076: 056: 104: 013: 002: 066: 377: |
| 004 060 | 307: 044: 300: 004: 055: 066: 372: 370: |
| 004 070 | 360: 006: 020: 247: 066: 375: 036: 007: |
| 004 100 | 076: 113: 110: 007: 002: 031: 076: 140: |
| 004 110 | 104: 007: 002: 066: 367: 076: 050: 345: |
| 004 120 | 056: 002: 066: 353: 106: 323: 002: 066: |
| 004 130 | 375: 076: 140: 036: 002: 104: 007: 002: |
| 004 140 | 066: 372: 367: 061: 317: 006: 300: 246: |
| 004 150 | 066: 054: 371: 066: 360: 370: 004: 050: |
| 004 160 | 060: 370: 066: 375: 076: 173: 036: 005: |
| 004 170 | 104: 007: 002: 106: 353: 003: 036: 007: |
| 004 200 | 160: 000: 002: 106: 336: 003: 036: 004: |
| 004 210 | 104: 007: 002: 005: 250: 106: 370: 003: |
| 004 220 | 110: 274: 004: 006: 300: 246: 340: 006: |
| 004 230 | 367: 202: 369: 374: 363: 307: 262: 370: |
| 004 240 | 066: 377: 307: 022: 260: 022: 370: 044: |
| 004 250 | 300: 203: 066: 372: 370: 066: 376: 076: |
| 004 260 | 005: 063: 372: 367: 104: 103: 005: 000: |
| 004 270 | 000: 000: 000: 000: 036: 004: 006: 010: |
| 004 300 | 066: 372: 367: 247: 110: 000: 002: 066: |

| | |
|---|---|
| 004 310 | 375: 076: 321: 060: 076: 004: 104: 007: |
| 004 320 | 002: 066: 367: 076: 360: 345: 066: 050: |
| 004 330 | 106: 323: 002: 066: 375: 076: 344: 036: |
| 004 340 | 002: 104: 007: 002: 066: 367: 076: 050: |
| 004 350 | 345: 056: 002: 066: 347: 106: 323: 002: |
| 004 360 | 036: 001: 066: 372: 367: 307: 064: 010: |
| 004 370 | 370: 104: 270: 002: 000: 003: 000: 004: |
| 005 000 | 006: 010: 106: 370: 003: 150: 037: 005: |
| 005 010 | 006: 167: 241: 370: 066: 375: 076: 025: |
| 005 020 | 036: 007: 104: 007: 002: 066: 367: 076: |
| 005 030 | 050: 345: 066: 360: 106: 323: 002: 036: |
| 005 040 | 001: 104: 270: 002: 006: 074: 106: 370: |
| 005 050 | 003: 110: 274: 004: 061: 036: 003: 317: |
| 005 060 | 010: 371: 306: 044: 077: 360: 371: 104: |
| 005 070 | 270: 002: 006: 044: 106: 370: 003: 110: |
| 005 100 | 274: 004: 370: 306: 066: 361: 370: 061: |
| 005 110 | 044: 300: 370: 066: 375: 076: 124: 036: |
| 005 120 | 005: 104: 007: 002: 106: 353: 003: 036: |
| 005 130 | 014: 160: 000: 002: 076: 000: 006: 077: |
| 005 140 | 246: 360: 076: 000: 036: 006: 104: 007: |
| 005 150 | 002: 000: 000: 006: 020: 066: 372: 367: |
| 005 160 | 247: 150: 200: 005: 106: 226: 005: 066: |
| 005 170 | 375: 076: 072: 036: 004: 104: 007: 002: |
| 005 200 | 066: 276: 006: 057: 277: 036: 006: 066: |
| 005 210 | 375: 100: 221: 005: 076: 247: 104: 007: |
| 005 220 | 002: 076: 320: 104: 236: 024: 066: 364: |
| 005 230 | 307: 066: 057: 106: 077: 002: 066: 276: |
| 005 240 | 076: 377: 007: 000: 005: 000: 000: 006: |
| 005 250 | 054: 106: 370: 003: 110: 274: 004: 301: |
| 005 260 | 064: 200: 370: 066: 276: 327: 066: 274: |
| 005 270 | 307: 010: 160: 276: 005: 250: 310: 002: |
| 005 300 | 002: 201: 002: 202: 024: 050: 370: 074: |
| 005 310 | 020: 030: 100: 276: 004: 104: 270: 002: |
| 005 320 | 006: 054: 106: 370: 003: 110: 274: 004: |
| 005 330 | 076: 100: 306: 044: 300: 066: 276: 207: |
| 005 340 | 010: 160: 370: 005: 360: 317: 010: 006: |
| 005 350 | 017: 271: 036: 002: 140: 276: 004: 371: |
| 005 360 | 106: 336: 003: 036: 001: 104: 270: 002: |
| 005 370 | 066: 274: 317: 317: 360: 104: 357: 005: |
| 006 000 | 066: 365: 307: 345: 056: 010: 066: 145: |
| 006 010 | 060: 060: 277: 100: 010: 006: 061: 061: |
| 006 020 | 277: 140: 016: 006: 306: 024: 127: 032: |
| 006 030 | 066: 365: 354: 370: 104: 370: 006: 000: |
| 006 040 | 066: 365: 337: 061: 347: 066: 367: 106: |
| 006 050 | 300: 006: 026: 263: 106: 262: 006: 066: |
| 006 060 | 375: 076: 176: 104: 013: 002: 066: 367: |
| 006 070 | 026: 265: 106: 257: 006: 066: 271: 106: |
| 006 100 | 300: 006: 066: 375: 076: 151: 304: 260: |
| 006 110 | 120: 013: 002: 076: 120: 104: 013: 002: |
| 006 120 | 066: 375: 076: 151: 066: 167: 076: 012: |
| 006 130 | 066: 367: 337: 061: 347: 066: 201: 056: |
| 006 140 | 010: 106: 300: 006: 036: 005: 104: 007: |
| 006 150 | 002: 036: 001: 046: 000: 026: 267: 106: |
| 006 160 | 262: 006: 066: 273: 106: 300: 006: 066: |
| 006 170 | 375: 076: 221: 104: 013: 002: 016: 215: |
| 006 200 | 006: 164: 066: 173: 061: 371: 276: 160: |
| 006 210 | 204: 006: 066: 375: 076: 066: 104: 013: |
| 006 220 | 002: 066: 175: 305: 024: 011: 370: 061: |
| 006 230 | 076: 215: 066: 156: 076: 235: 066: 166: |
| 006 240 | 104: 243: 006: 306: 066: 256: 370: 066: |
| 006 250 | 361: 076: 012: 104: 050: 001: 361: 337: |
| 006 260 | 061: 347: 066: 274: 307: 260: 110: 277: |
| 006 270 | 006: 223: 330: 006: 000: 234: 340: 362: |
| 006 300 | 307: 203: 370: 061: 307: 214: 370: 007: |
| 006 310 | 250: 346: 307: 022: 370: 061: 307: 022: |
| 006 320 | 370: 061: 307: 022: 370: 061: 307: 022: |
| 006 330 | 370: 061: 227: 140: 345: 006: 060: 370: |
| 006 340 | 364: 347: 040: 374: 007: 364: 007: 016: |
| 006 350 | 030: 250: 066: 362: 076: 000: 066: 365: |
| 006 360 | 106: 310: 006: 011: 120: 360: 006: 007: |
| 006 370 | 066: 375: 076: 040: 104: 007: 002: 000: |
| 007 000 | 360: 307: 044: 177: 370: 066: 375: 076: |
| 007 010 | 140: 060: 076: 004: 104: 013: 002: 000: |
| 007 020 | 000: 104: 207: 000: 066: 362: 317: 301: |

| | | | | | | | | |
|---|---|---|---|---|---|---|---|---|
| 007 030 | 022: | 370: | 061: | 327: | 302: | 022: | 370: | 061: |
| 007 040 | 337: | 303: | 022: | 370: | 066: | 356: | 307: | 032: |
| 007 050 | 370: | 100: | 075: | 007: | 066: | 256: | 367: | 307: |
| 007 060 | 201: | 370: | 061: | 307: | 212: | 370: | 061: | 307: |
| 007 070 | 213: | 370: | 104: | 013: | 002: | 260: | 150: | 106: |
| 007 100 | 007: | 036: | 003: | 104: | 007: | 002: | 066: | 156: |
| 007 110 | 307: | 066: | 375: | 370: | 104: | 013: | 002: | 066: |
| 007 120 | 364: | 307: | 066: | 366: | 207: | 074: | 042: | 140: |
| 007 130 | 305: | 022: | 066: | 372: | 367: | 076: | 100: | 104: |
| 007 140 | 274: | 004: | 066: | 375: | 076: | 200: | 066: | 054: |
| 007 150 | 307: | 044: | 001: | 036: | 010: | 150: | 007: | 002: |
| 007 160 | 250: | 066: | 365: | 337: | 370: | 061: | 347: | 370: |
| 007 170 | 066: | 367: | 106: | 300: | 006: | 104: | 013: | 002: |
| 007 200 | 066: | 367: | 026: | 261: | 106: | 257: | 006: | 066: |
| 007 210 | 365: | 337: | 061: | 347: | 066: | 367: | 106: | 300: |
| 007 220 | 006: | 060: | 267: | 036: | 001: | 150: | 132: | 007: |
| 007 230 | 066: | 375: | 076: | 237: | 104: | 013: | 002: | 345: |
| 007 240 | 066: | 365: | 307: | 004: | 151: | 061: | 307: | 014: |
| 007 250 | 000: | 110: | 270: | 007: | 066: | 375: | 076: | 000: |
| 007 260 | 060: | 076: | 006: | 036: | 007: | 104: | 007: | 002: |
| 007 270 | 066: | 156: | 076: | 345: | 066: | 375: | 076: | 024: |
| 007 300 | 066: | 365: | 317: | 061: | 327: | 066: | 362: | 371: |
| 007 310 | 061: | 372: | 061: | 076: | 000: | 056: | 101: | 066: |
| 007 320 | 125: | 307: | 354: | 066: | 356: | 370: | 066: | 256: |
| 007 330 | 076: | 365: | 066: | 365: | 250: | 370: | 061: | 370: |
| 007 340 | 061: | 370: | 104: | 013: | 002: | 066: | 156: | 076: |
| 007 350 | 134: | 066: | 361: | 076: | 024: | 036: | 310: | 046: |
| 007 360 | 000: | 066: | 365: | 106: | 300: | 006: | 061: | 006: |
| 007 370 | 000: | 217: | 370: | 036: | 001: | 104: | 050: | 001: |
| 014 000 | 015: | 123: | 010: | 013: | 121: | 010: | 300: | 273: |
| 014 010 | 013: | 300: | 273: | 018: | 200: | 271: | 013: | 200: |
| 014 020 | 271: | 012: | 000: | 000: | 326: | 123: | 010: | 200: |
| 014 030 | 173: | 210: | 011: | 177: | 210: | 120: | 205: | 210: |
| 014 040 | 262: | 201: | 010: | 200: | 265: | 013: | 200: | 265: |
| 014 050 | 012: | 011: | 261: | 013: | 011: | 261: | 012: | 120: |
| 014 060 | 263: | 013: | 120: | 263: | 012: | 300: | 267: | 013: |
| 014 070 | 300: | 267: | 012: | 000: | 000: | 000: | 000: | 000: |
| 014 100 | 006: | 302: | 066: | 310: | 016: | 215: | 061: | 371: |
| 014 110 | 276: | 160: | 106: | 014: | 066: | 375: | 076: | 120: |
| 014 120 | 066: | 357: | 104: | 364: | 014: | 004: | 003: | 370: |
| 014 130 | 056: | 014: | 317: | 060: | 307: | 036: | 003: | 260: |
| 014 140 | 150: | 156: | 020: | 060: | 327: | 354: | 340: | 301: |
| 014 150 | 044: | 017: | 066: | 311: | 150: | 162: | 014: | 054: |
| 014 160 | 010: | 370: | 301: | 012: | 012: | 012: | 012: | 012: |
| 014 170 | 044: | 017: | 150: | 200: | 014: | 054: | 010: | 370: |
| 014 200 | 302: | 044: | 017: | 024: | 011: | 160: | 213: | 014: |
| 014 210 | 066: | 300: | 370: | 364: | 345: | 352: | 317: | 061: |
| 014 220 | 106: | 260: | 015: | 061: | 337: | 050: | 354: | 122: |
| 014 230 | 017: | 024: | 066: | 365: | 371: | 061: | 372: | 061: |
| 014 240 | 373: | 066: | 307: | 104: | 243: | 006: | 066: | 160: |
| 014 250 | 307: | 260: | 036: | 013: | 110: | 007: | 002: | 016: |
| 014 260 | 164: | 006: | 176: | 004: | 113: | 360: | 327: | 024: |
| 014 270 | 114: | 300: | 372: | 271: | 110: | 263: | 014: | 061: |
| 014 300 | 076: | 140: | 061: | 076: | 140: | 061: | 076: | 211: |
| 014 310 | 061: | 076: | 200: | 066: | 375: | 076: | 174: | 060: |
| 014 320 | 076: | 017: | 104: | 013: | 002: | 376: | 123: | 010: |
| 014 330 | 000: | 371: | 010: | 000: | 000: | 374: | 123: | 010: |
| 014 340 | 000: | 371: | 010: | 000: | 000: | 134: | 123: | 010: |
| 014 350 | 040: | 125: | 010: | 000: | 371: | 010: | 000: | 000: |
| 014 360 | 000: | 000: | 000: | 377: | 317: | 345: | 301: | 004: |
| 014 370 | 003: | 370: | 361: | 104: | 130: | 014: | 000: | 377: |
| 015 000 | 066: | 375: | 076: | 013: | 066: | 065: | 026: | 173: |
| 015 010 | 104: | 073: | 015: | 066: | 375: | 076: | 026: | 066: |
| 015 020 | 261: | 026: | 177: | 104: | 073: | 015: | 066: | 375: |
| 015 030 | 076: | 041: | 066: | 263: | 026: | 205: | 104: | 073: |
| 015 040 | 015: | 066: | 266: | 345: | 056: | 013: | 250: | 370: |
| 015 050 | 060: | 370: | 051: | 370: | 061: | 370: | 066: | 200: |
| 015 060 | 056: | 010: | 370: | 060: | 370: | 036: | 005: | 354: |
| 015 070 | 104: | 000: | 002: | 056: | 012: | 046: | 000: | 307: |
| 015 100 | 374: | 050: | 207: | 374: | 310: | 061: | 307: | 374: |
| 015 110 | 051: | 217: | 374: | 330: | 022: | 044: | 001: | 340: |
| 015 120 | 362: | 056: | 010: | 307: | 201: | 370: | 061: | 307: |
| 015 130 | 213: | 370: | 061: | 307: | 214: | 370: | 060: | 060: |
| 015 140 | 307: | 024: | 200: | 310: | 061: | 307: | 034: | 226: |

| | |
|---|---|
| 015 150 | 330: 061: 307: 034: 230: 140: 013: 002: |
| 015 160 | 370: 060: 373: 060: 371: 104: 013: 002: |
| 015 170 | 174: 017: 000: 145: 174: 017: 024: 145: |
| 015 200 | 174: 017: 335: 145: 174: 017: 325: 145: |
| 015 210 | 174: 017: 345: 145: 274: 004: 000: 000: |
| 015 220 | 000: 015: 000: 000: 055: 153: 350: 050: |
| 015 230 | 071: 017: 000: 000: 000: 000: 000: 000: |
| 015 240 | 066: 257: 046: 360: 370: 061: 041: 110: |
| 015 250 | 244: 015: 050: 130: 240: 015: 007: 007: |
| 015 260 | 327: 306: 074: 270: 043: 250: 370: 060: |
| 015 270 | 370: 061: 007: 000: 000: 000: 000: 000: |
| 015 300 | 116: 035: 005: 000: 166: 136: 005: 000: |
| 015 310 | 153: 055: 050: 350: 067: 060: 073: 000: |
| 015 320 | 075: 060: 073: 000: 147: 116: 027: 000: |
| 015 330 | 147: 005: 035: 000: 017: 116: 027: 000: |
| 015 340 | 106: 306: 023: 066: 377: 307: 241: 202: |
| 015 350 | 066: 372: 370: 104: 000: 007: 230: 016: |
| 015 360 | 230: 016: 201: 022: 230: 016: 000: 005: |
| 015 370 | 321: 021: 336: 016: 373: 016: 250: 020: |
| 016 000 | 006: 010: 106: 370: 003: 110: 274: 004: |
| 016 010 | 066: 277: 307: 074: 023: 150: 000: 023: |
| 016 020 | 104: 364: 000: 111: 044: 160: 064: 205: |
| 016 030 | 205: 006: 002: 110: 040: 016: 006: 015: |
| 016 040 | 066: 277: 277: 300: 036: 005: 150: 002: |
| 016 050 | 023: 066: 356: 076: 040: 060: 076: 024: |
| 016 060 | 104: 210: 022: 066: 224: 106: 306: 023: |
| 016 070 | 076: 366: 066: 356: 076: 161: 060: 076: |
| 016 100 | 016: 066: 361: 076: 056: 061: 076: 000: |
| 016 110 | 066: 375: 076: 125: 060: 076: 016: 104: |
| 016 120 | 013: 002: 000: 013: 002: 106: 353: 003: |
| 016 130 | 160: 142: 016: 076: 000: 036: 006: 104: |
| 016 140 | 007: 002: 066: 256: 317: 060: 327: 066: |
| 016 150 | 375: 371: 060: 372: 036: 005: 104: 007: |
| 016 160 | 002: 066: 055: 076: 007: 066: 277: 006: |
| 016 170 | 002: 277: 066: 310: 150: 340: 015: 066: |
| 016 200 | 054: 076: 377: 066: 010: 076: 147: 066: |
| 016 210 | 367: 076: 050: 345: 066: 304: 056: 015: |
| 016 220 | 106: 323: 002: 036: 001: 104: 000: 002: |
| 016 230 | 006: 010: 106: 370: 003: 110: 274: 004: |
| 016 240 | 006: 007: 241: 150: 251: 016: 170: 274: |
| 016 250 | 004: 301: 045: 370: 310: 066: 276: 307: |
| 016 260 | 024: 047: 370: 261: 066: 366: 370: 066: |
| 016 270 | 054: 250: 370: 066: 010: 370: 066: 375: |
| 016 300 | 076: 307: 036: 004: 104: 007: 002: 066: |
| 016 310 | 367: 076: 050: 345: 066: 276: 307: 002: |
| 016 320 | 002: 004: 310: 360: 056: 015: 106: 323: |
| 016 330 | 002: 036: 001: 104: 000: 002: 006: 010: |
| 016 340 | 106: 370: 003: 110: 274: 004: 006: 007: |
| 016 350 | 241: 150: 274: 004: 002: 002: 003: 002: |
| 016 360 | 261: 370: 066: 053: 076: 147: 026: 164: |
| 016 370 | 104: 134: 017: 006: 010: 106: 370: 003: |
| 017 000 | 110: 274: 004: 006: 007: 241: 170: 274: |
| 017 010 | 004: 002: 002: 002: 002: 241: 150: 274: |
| 017 020 | 004: 066: 053: 307: 054: 116: 370: 036: |
| 017 030 | 004: 110: 270: 002: 026: 210: 104: 134: |
| 017 040 | 017: 345: 250: 056: 012: 066: 273: 036: |
| 017 050 | 004: 370: 061: 031: 110: 051: 017: 050: |
| 017 060 | 130: 045: 017: 354: 036: 001: 104: 270: |
| 017 070 | 002: 066: 360: 076: 240: 060: 076: 360: |
| 017 100 | 066: 375: 076: 111: 036: 011: 104: 007: |
| 017 110 | 002: 106: 353: 003: 036: 010: 160: 000: |
| 017 120 | 002: 345: 056: 010: 076: 000: 354: 036: |
| 017 130 | 005: 104: 007: 002: 006: 007: 241: 002: |
| 017 140 | 002: 202: 345: 056: 015: 360: 307: 060: |
| 017 150 | 317: 060: 327: 060: 337: 354: 066: 375: |
| 017 160 | 370: 060: 371: 066: 357: 372: 066: 156: |
| 017 170 | 373: 104: 013: 002: 066: 357: 307: 260: |
| 017 200 | 120: 042: 020: 345: 056: 014: 360: 060: |
| 017 210 | 307: 260: 110: 227: 017: 354: 066: 357: |
| 017 220 | 307: 024: 003: 370: 104: 204: 017: 074: |
| 017 230 | 371: 110: 126: 020: 354: 066: 300: 307: |
| 017 240 | 074: 215: 150: 063: 020: 060: 317: 011: |
| 017 250 | 120: 257: 017: 016: 011: 024: 001: 371: |
| 017 260 | 061: 370: 261: 261: 150: 157: 020: 066: |

| | | | | | | | | |
|---|---|---|---|---|---|---|---|---|
| 017 270 | 375: | 076: | 301: | 060: | 076: | 017: | 104: | 013: |
| 017 300 | 002: | 066: | 366: | 307: | 044: | 007: | 074: | 003: |
| 017 310 | 006: | 120: | 110: | 316: | 017: | 250: | 066: | 367: |
| 017 320 | 317: | 011: | 371: | 345: | 056: | 001: | 361: | 327: |
| 017 330 | 354: | 330: | 066: | 365: | 307: | 044: | 007: | 074: |
| 017 340 | 005: | 303: | 110: | 350: | 017: | 321: | 006: | 053: |
| 017 350 | 202: | 022: | 066: | 151: | 337: | 345: | 056: | 010: |
| 017 360 | 360: | 307: | 106: | 356: | 024: | 060: | 317: | 066: |
| 017 370 | 371: | 371: | 061: | 044: | 177: | 370: | 006: | 300: |
| 020 000 | 242: | 002: | 320: | 020: | 354: | 066: | 310: | 076: |
| 020 010 | 215: | 120: | 016: | 020: | 076: | 006: | 060: | 076: |
| 020 020 | 215: | 100: | 026: | 020: | 076: | 001: | 036: | 001: |
| 020 030 | 066: | 375: | 076: | 100: | 060: | 076: | 014: | 104: |
| 020 040 | 007: | 002: | 066: | 300: | 006: | 215: | 370: | 060: |
| 020 050 | 370: | 066: | 310: | 370: | 060: | 370: | 036: | 003: |
| 020 060 | 104: | 030: | 020: | 066: | 366: | 307: | 044: | 007: |
| 020 070 | 074: | 005: | 050: | 076: | 050: | 140: | 102: | 020: |
| 020 100 | 076: | 020: | 066: | 301: | 076: | 001: | 061: | 076: |
| 020 110 | 004: | 140: | 122: | 020: | 060: | 076: | 006: | 061: |
| 020 120 | 076: | 001: | 307: | 104: | 245: | 017: | 310: | 060: |
| 020 130 | 327: | 354: | 066: | 300: | 076: | 215: | 060: | 076: |
| 020 140 | 215: | 066: | 151: | 337: | 361: | 061: | 352: | 307: |
| 020 150 | 106: | 356: | 024: | 104: | 376: | 017: | 354: | 066: |
| 020 160 | 367: | 076: | 015: | 066: | 375: | 076: | 175: | 060: |
| 020 170 | 076: | 020: | 104: | 013: | 002: | 066: | 160: | 307: |
| 020 200 | 260: | 036: | 014: | 160: | 007: | 002: | 076: | 200: |
| 020 210 | 060: | 076: | 205: | 060: | 076: | 000: | 060: | 076: |
| 020 220 | 000: | 066: | 367: | 317: | 011: | 371: | 036: | 005: |
| 020 230 | 110: | 007: | 002: | 066: | 053: | 076: | 000: | 036: |
| 020 240 | 001: | 104: | 000: | 002: | 000: | 000: | 000: | 000: |
| 020 250 | 066: | 276: | 006: | 057: | 277: | 036: | 006: | 066: |
| 020 260 | 375: | 076: | 304: | 140: | 273: | 020: | 076: | 055: |
| 020 270 | 060: | 076: | 021: | 104: | 007: | 002: | 140: | 274: |
| 020 300 | 004: | 104: | 270: | 002: | 006: | 010: | 106: | 370: |
| 020 310 | 003: | 110: | 274: | 004: | 301: | 064: | 200: | 370: |
| 020 320 | 006: | 007: | 241: | 150: | 274: | 004: | 130: | 274: |
| 020 330 | 004: | 066: | 274: | 010: | 160: | 344: | 020: | 076: |
| 020 340 | 000: | 060: | 076: | 000: | 066: | 375: | 076: | 360: |
| 020 350 | 060: | 076: | 020: | 036: | 006: | 104: | 007: | 002: |
| 020 360 | 066: | 275: | 347: | 061: | 337: | 250: | 303: | 022: |
| 020 370 | 310: | 304: | 022: | 320: | 301: | 022: | 310: | 302: |
| 021 000 | 022: | 320: | 301: | 203: | 310: | 302: | 214: | 320: |
| 021 010 | 301: | 022: | 310: | 302: | 022: | 320: | 066: | 276: |
| 021 020 | 307: | 024: | 060: | 201: | 310: | 066: | 274: | 370: |
| 021 030 | 006: | 000: | 212: | 060: | 370: | 074: | 003: | 036: |
| 021 040 | 001: | 140: | 270: | 002: | 110: | 274: | 004: | 006: |
| 021 050 | 347: | 271: | 104: | 276: | 020: | 006: | 010: | 106: |
| 021 060 | 370: | 003: | 110: | 274: | 004: | 006: | 177: | 241: |
| 021 070 | 370: | 044: | 007: | 150: | 273: | 021: | 130: | 274: |
| 021 100 | 004: | 074: | 005: | 066: | 276: | 307: | 100: | 240: |
| 021 110 | 021: | 010: | 160: | 174: | 021: | 066: | 150: | 317: |
| 021 120 | 370: | 361: | 076: | 000: | 360: | 076: | 147: | 002: |
| 021 130 | 345: | 056: | 010: | 360: | 327: | 060: | 317: | 354: |
| 021 140 | 302: | 002: | 066: | 054: | 370: | 302: | 044: | 077: |
| 021 150 | 320: | 066: | 365: | 371: | 061: | 372: | 061: | 076: |
| 021 160 | 000: | 066: | 156: | 076: | 274: | 036: | 001: | 066: |
| 021 170 | 173: | 104: | 000: | 024: | 002: | 330: | 066: | 274: |
| 021 200 | 317: | 060: | 327: | 066: | 054: | 307: | 012: | 044: |
| 021 210 | 200: | 262: | 064: | 100: | 066: | 151: | 076: | 377: |
| 021 220 | 345: | 056: | 010: | 363: | 370: | 050: | 060: | 370: |
| 021 230 | 060: | 371: | 051: | 061: | 371: | 104: | 013: | 002: |
| 021 240 | 320: | 004: | 131: | 345: | 056: | 022: | 360: | 307: |
| 021 250 | 354: | 074: | 377: | 100: | 274: | 004: | 010: | 160: |
| 021 260 | 175: | 021: | 362: | 327: | 066: | 014: | 372: | 300: |
| 021 270 | 104: | 130: | 021: | 066: | 276: | 367: | 307: | 260: |
| 021 300 | 150: | 274: | 004: | 066: | 366: | 076: | 003: | 066: |
| 021 310 | 356: | 076: | 365: | 060: | 076: | 021: | 104: | 101: |
| 021 320 | 016: | 006: | 010: | 106: | 370: | 003: | 110: | 274: |
| 021 330 | 004: | 301: | 044: | 007: | 150: | 351: | 021: | 074: |
| 021 340 | 003: | 110: | 274: | 004: | 066: | 054: | 104: | 055: |
| 021 350 | 005: | 076: | 005: | 066: | 356: | 076: | 012: | 060: |
| 021 360 | 076: | 022: | 104: | 101: | 016: | 066: | 367: | 076: |
| 021 370 | 050: | 345: | 066: | 324: | 056: | 015: | 106: | 323: |

| | |
|---|---|
| 022 000 | 002: 066: 150: 076: 000: 036: 001: 104: |
| 022 010 | 270: 002: 066: 367: 076: 050: 345: 066: |
| 022 020 | 334: 056: 015: 106: 323: 002: 066: 006: |
| 022 030 | 076: 005: 066: 025: 076: 075: 250: 056: |
| 022 040 | 010: 066: 127: 370: 050: 060: 370: 066: |
| 022 050 | 170: 076: 377: 051: 061: 076: 377: 354: |
| 022 060 | 066: 360: 076: 020: 066: 375: 076: 076: |
| 022 070 | 060: 076: 022: 104: 013: 002: 066: 360: |
| 022 100 | 307: 024: 001: 150: 000: 002: 370: 360: |
| 022 110 | 345: 056: 003: 317: 004: 377: 056: 001: |
| 022 120 | 360: 367: 354: 371: 036: 007: 104: 007: |
| 022 130 | 002: 130: 377: 377: 150: 136: 377: 124: |
| 022 140 | 156: 377: 377: 377: 144: 377: 377: 164: |
| 022 150 | 132: 377: 377: 152: 140: 377: 122: 160: |
| 022 160 | 377: 377: 377: 146: 377: 377: 377: 134: |
| 022 170 | 377: 377: 154: 142: 377: 377: 162: 377: |
| 022 200 | 377: 066: 356: 076: 072: 060: 076: 016: |
| 022 210 | 066: 151: 337: 030: 076: 277: 110: 236: |
| 022 220 | 022: 106: 226: 005: 066: 375: 076: 336: |
| 022 230 | 060: 076: 016: 104: 013: 002: 066: 366: |
| 022 240 | 076: 000: 104: 142: 016: 002: 360: 061: |
| 022 250 | 345: 056: 010: 317: 061: 307: 354: 320: |
| 022 260 | 044: 077: 066: 362: 371: 061: 370: 006: |
| 022 270 | 200: 242: 300: 002: 002: 004: 365: 066: |
| 022 300 | 256: 370: 104: 244: 000: 066: 372: 307: |
| 022 310 | 024: 005: 066: 361: 370: 061: 044: 300: |
| 022 320 | 370: 036: 004: 066: 375: 076: 335: 060: |
| 022 330 | 076: 022: 104: 007: 002: 106: 353: 003: |
| 022 340 | 160: 370: 022: 044: 077: 002: 004: 240: |
| 022 350 | 320: 020: 337: 046: 000: 066: 274: 307: |
| 022 360 | 056: 010: 106: 265: 006: 104: 013: 002: |
| 022 370 | 066: 376: 076: 007: 104: 142: 007: 000: |
| 023 000 | 036: 004: 066: 375: 076: 014: 060: 076: |
| 023 010 | 023: 104: 007: 002: 111: 002: 002: 002: |
| 023 020 | 205: 044: 003: 036: 005: 046: 157: 066: |
| 023 030 | 277: 307: 110: 345: 023: 074: 002: 110: |
| 023 040 | 000: 002: 046: 063: 054: 021: 370: 066: |
| 023 050 | 375: 374: 104: 013: 002: 000: 000: 116: |
| 023 060 | 035: 005: 000: 066: 367: 076: 150: 345: |
| 023 070 | 066: 050: 106: 323: 002: 066: 375: 076: |
| 023 100 | 110: 036: 001: 104: 007: 002: 000: 000: |
| 023 110 | 066: 367: 076: 050: 345: 066: 056: 056: |
| 023 120 | 023: 106: 323: 002: 066: 375: 076: 135: |
| 023 130 | 036: 001: 104: 007: 002: 066: 372: 367: |
| 023 140 | 307: 076: 000: 066: 250: 370: 066: 274: |
| 023 150 | 076: 000: 036: 001: 104: 000: 002: 066: |
| 023 160 | 372: 367: 307: 012: 326: 066: 367: 076: |
| 023 170 | 050: 362: 076: 020: 345: 140: 220: 023: |
| 023 200 | 316: 066: 250: 307: 361: 370: 066: 150: |
| 023 210 | 106: 323: 002: 036: 001: 104: 009: 002: |
| 023 220 | 056: 002: 066: 353: 104: 210: 023: 066: |
| 023 230 | 372: 327: 362: 317: 066: 276: 307: 024: |
| 023 240 | 070: 140: 274: 004: 110: 263: 023: 271: |
| 023 250 | 110: 274: 004: 368: 076: 200: 036: 005: |
| 023 260 | 104: 270: 002: 301: 074: 200: 110: 274: |
| 023 270 | 004: 066: 376: 076: 000: 302: 362: 076: |
| 023 300 | 001: 036: 003: 104: 141: 000: 345: 056: |
| 023 310 | 015: 307: 060: 317: 060: 327: 060: 337: |
| 023 320 | 354: 360: 307: 361: 370: 066: 367: 372: |
| 023 330 | 363: 106: 323: 002: 066: 372: 016: 300: |
| 023 340 | 026: 055: 007: 000: 000: 074: 023: 110: |
| 023 350 | 000: 002: 104: 044: 023: 000: 274: 004: |
| 023 360 | 274: 004: 274: 004: 274: 004: 000: 005: |
| 023 370 | 274: 004: 274: 004: 274: 004: 227: 023: |
| 024 000 | 066: 170: 076: 215: 060: 076: 215: 060: |
| 024 010 | 076: 000: 060: 104: 243: 006: 000: 066: |
| 024 020 | 365: 307: 044: 007: 074: 003: 036: 000: |
| 024 030 | 043: 006: 077: 242: 320: 036: 000: 007: |
| 024 040 | 066: 360: 076: 300: 060: 076: 312: 066: |
| 024 050 | 375: 076: 061: 060: 076: 024: 104: 013: |
| 024 060 | 002: 106: 353: 003: 160: 112: 024: 317: |
| 024 070 | 336: 345: 056: 011: 006: 061: 206: 360: |
| 024 100 | 327: 371: 363: 354: 372: 104: 013: 002: |
| 024 110 | 066: 277: 307: 054: 017: 370: 012: 100: |

| | | | | | | | |
|---|---|---|---|---|---|---|---|
| 024 120 | 072: | 016: | 104: | 063: | 016: | 066: | 163: | 307: |
| 024 130 | 061: | 267: | 110: | 043: | 003: | 061: | 307: | 260: |
| 024 140 | 016: | 003: | 160: | 147: | 024: | 016: | 014: | 111: |
| 024 150 | 201: | 044: | 017: | 066: | 176: | 370: | 036: | 001: |
| 024 160 | 106: | 324: | 003: | 076: | 173: | 060: | 076: | 024: |
| 024 170 | 104: | 007: | 002: | 066: | 056: | 357: | 111: | 044: |
| 024 200 | 017: | 066: | 176: | 227: | 150: | 273: | 003: | 024: |
| 024 210 | 003: | 044: | 017: | 150: | 223: | 024: | 036: | 003: |
| 024 220 | 104: | 007: | 002: | 345: | 056: | 010: | 066: | 376: |
| 024 230 | 076: | 003: | 354: | 104: | 304: | 003: | 066: | 276: |
| 024 240 | 307: | 002: | 360: | 345: | 056: | 010: | 307: | 060: |
| 024 250 | 267: | 354: | 036: | 001: | 110: | 007: | 002: | 104: |
| 024 260 | 270: | 002: | 345: | 056: | 010: | 066: | 373: | 307: |
| 024 270 | 024: | 001: | 074: | 170: | 102: | 337: | 024: | 310: |
| 024 300 | 004: | 171: | 320: | 371: | 361: | 307: | 050: | 060: |
| 024 310 | 277: | 362: | 112: | 342: | 024: | 370: | 361: | 060: |
| 024 320 | 370: | 051: | 061: | 370: | 354: | 066: | 375: | 076: |
| 024 330 | 155: | 060: | 076: | 002: | 104: | 013: | 002: | 006: |
| 024 340 | 167: | 007: | 066: | 122: | 337: | 030: | 373: | 051: |
| 024 350 | 061: | 373: | 050: | 362: | 307: | 007: | 320: | 243: |
| 024 360 | 370: | 060: | 160: | 370: | 024: | 050: | 370: | 051: |
| 024 370 | 061: | 007: | 110: | 000: | 002: | 104: | 041: | 017: |

APPENDIX II

INDEX REGISTER INSTRUCTIONS

LOAD DATA TO INDEX REGISTERS - One Byte

Data may be loaded into or moved between any of the index registers, or memory registers.

$Lr_1r_2$      11    DDD    SSS    $(r_1) \leftarrow (r_2)$ Load register $r_1$
(one cycle —PCI)     with the content of $r_2$. The content of $r_2$ remains unchanged. If SSS=DDD, the instruction is a NOP (no operation).

LrM      11    DDD    111    (r) ← (M) Load register r with
(two cycles—     the content of the memory location
PCI/PCR)     addressed by the contents of registers H and L. (DDD   111 — HALT instr.)

LMr      11    111    SSS    (M) ← (r) Load the memory
(two cycles —     location addressed by the con-
PCI/PCW)     tents of registers H and L with the content of register r. (SSS   111 —HALT instr.)

LOAD DATA IMMEDIATE —Two Bytes

A byte of data immediately following the instruction may be loaded into the processor or into the memory.

LrI      00    DDD    110    (r) ← $<B_2>$ Load byte two of the
(two cycles —    $<B_2>$    instruction into register r.
PCI/PCR)

LMI      00    111    110    (M) ← $<B_2>$ Load byte two of the
(three cycles —    $<B_2>$    instruction into the memory
PCI/PCR/PCW)     location addressed by the contents of registers H and L.

INCREMENT INDEX REGISTER —One Byte

INr      00    DDD    000    (r) ← (r)+1. The content of re-
(one cycle —PCI)     gister r is incremented by one. All of the condition flip-flops except carry are affected by the result. Note that DDD   000 (HALT instr.) and DDD   111 (content of memory may not be incremented).

DECREMENT INDEX REGISTER —One Byte

DCr      00    DDD    001    (r) ← (r)−1. The content of re-
(one cycle —PCI)     gister r is decremented by one.

ACCUMULATOR GROUP INSTRUCTIONS

Operations are performed and the status flip-flops, C,Z,S,P, are set based on the result of the operation. Logical operations (NDr, XRr, ORr) set the carry flip-flop to zero. Rotate operations affect only the carry flip-flop. Two's complement subtraction is used.

ALU INDEX REGISTER INSTRUCTIONS - One Byte
(one cycle - PCI)

Index Register operations are carried out between the accumulator and the content of one of the index registers (SSS=000 through SSS=110). The previous content of register SSS is unchanged by the operation.

ADr      10    000    SSS    (A) ← (A)+(r) Add the content of
    register r to the content of register A and place the result into register A.

ACr      10    001    SSS    (A) ← (A)+(r)+(carry) Add the
    content of register r and the contents of the carry flip-flop to the content of the A register and place the result into Register A.

SUr      10    010    SSS    (A) ← (A)−(r) Subtract the con-
    tent of register r from the content of Register A and place the result into Register A. Two's complement subtraction is used.

APPENDIX II-continued

| | | | | |
|---|---|---|---|---|
| SBr | 10 | 011 | SSS | (A) ← (A)−(r)−(borrow) Subtract the content of register r and the content of the carry flip-flop from the content of register A and place the result into register A. |
| NDr | 10 | 100 | SSS | (A) ← (A)∧(r) Place the logical product of the register A and register r into register A. |
| XRr | 10 | 101 | SSS | (A) ← (A)∀(r) Place the "exclusive - or" of the content of register A and register r into register A. |
| ORr | 10 | 110 | SSS | (A) ← (A) V (r) Place the "inclusive - or" of the content of register A and register r into register A. |
| CPr | 10 | 111 | SSS | (A)−(r) Compare the content of register A with the content of register r. The content of register A remains unchanged. The flag flip-flops are set by the result of the subtraction. Equality or inequality is indicated by the zero flip-flip. Less than or greater than is indicated by the carry flip-flop. |

ALU OPERATIONS WITH MEMORY - One Byte
(two cycles - PCI/PCR)
Arithmetic and logical operations are carried out between the accumulator
and the byte of data addressed by the contents of registers H and L

| | | | | |
|---|---|---|---|---|
| ADM | 10 | 000 | 111 | (A) ← (A)+(M) ADD |
| ACM | 10 | 001 | 111 | (A) ← (A)+(M)+(carry) ADD with carry |
| SUM | 10 | 010 | 111 | (A) ← (A)−(M) SUBTRACT |
| SBM | 10 | 011 | 111 | (A) ← (A)−(M)−(borrow) SUBTRACT with borrow |
| NDM | 10 | 100 | 111 | (A) ← (A)∧(M) Logical AND |
| XRM | 10 | 101 | 111 | (A) ← (A)∀(M) Exclusive OR |
| ORM | 10 | 110 | 111 | (A) ← (A) V (M) Inclusive OR |
| CPM | 10 | 111 | 111 | (A)−(M) COMPARE |

ALU IMMEDIATE INSTRUCTIONS - Two Bytes
(two cycles - PCI/PCR)
Arithmetic and logical operations are carried out between the accumulator
and the byte of data immediately following the instruction.

| | | | | |
|---|---|---|---|---|
| ADI | 00 | 000 <br> $<B_2>$ | 100 | (A) ← (A)+$<B_2>$ ADD |
| ACI | 00 | 001 <br> $<B_2>$ | 100 | (A) ← (A)+$<B_2>$+(carry) ADD with carry |
| SUI | 00 | 010 <br> $<B_2>$ | 100 | (A) ← (A)−$<B_2>$ SUBTRACT |
| SBI | 00 | 011 <br> $<B_2>$ | 100 | (A) ← (A)−$<B_2>$−(borrow) SUBTRACT with borrow |
| NDI | 00 | 100 <br> $<B_2>$ | 100 | (A) ← (A)∧$<B_2>$ Logical AND |
| XRI | 00 | 101 <br> $<B_2>$ | 100 | (A) ← (A)∀$<B_2>$ Exclusive OR |
| ORI | 00 | 110 <br> $<B_2>$ | 100 | (A) ← (A) V $<B_2>$ Inclusive OR |
| CPI | 00 | 111 <br> $<B_2>$ | 100 | (A)−$<B_2>$ COMPARE |

ROTATE INSTRUCTIONS - One Byte
(one cycle - PCI)
The accumulator content (register A) may be rotated either right or left,
around the carry bit or through the carry bit. Only the carry flip-flop is
affected by these instructions; the other flags are unchanged.

| | | | | |
|---|---|---|---|---|
| RLC | 00 | 000 | 010 | $A_{m+1}$ ← $A_m$, $A_o$ ← $A_7$, (carry) $A_7$ Rotate the content of register A left one bit. Rotate $A_7$ into $A_o$ and into the carry flip-flop. |
| RRC | 00 | 001 | 010 | $A_m$ ← $A_{m+1}$, $A_7$ ← $A_o$ (carry) $A_o$ Rotate the content of register A right one bit. Rotate $A_o$ into $A_7$ and into the carry flip-flop. |
| RAL | 00 | 010 | 010 | $A_{m+1}$ ← $A_m$, $A_o$ ← (carry),(carry) ← $A_7$, Rotate the content of Register A left one bit. Rotate the content of the carry flip-flop into $A_o$. Rotate $A_7$ into the carry flip-flop. |
| RAR | 00 | 011 | 010 | $A_m$ ← $A_{m+1}$, $A_7$ ← (carry),(carry) ← $A_o$, Rotate the content of Register A right one bit. Rotate the content of the carry flip-flop into $A_7$. Rotate $A_o$ into the carry flip-flop. |

APPENDIX II-continued

PROGRAM COUNTER AND STACK CONTROL INSTRUCTIONS

JUMP INSTRUCTIONS - Three Bytes
(three cycles - PCI/PCR/PCR)
Normal flow of the microprogram may be altered by jumping to an address specified by bytes two and three of an instruction.

| | | | | |
|---|---|---|---|---|
| JMP<br>(Jump Unconditionally) | 01 | XXX<br>$<B_2>$<br>$<B_3>$ | 100 | (P) ← $<B_3><B_2>$ Jump unconditionally to the instruction located in memory location addressed by byte two and byte three. |
| JFc<br>(Jump if Condition False) | 01 | $0C_4C_3$<br>$<B_2>$<br>$<B_3>$ | 000 | If (c) = 0, (P) ← $<B_3><B_2>$. Otherwise, (P) = (P)+3. If the content of flip-flop c is zero, then jump to the instruction located in memory location $<B_3><B_2>$; otherwise, execute the next instruction in sequence. |
| JTc<br>(Jump if Condition True) | 01 | $1C_4C_3$<br>$<B_2>$<br>$<B_3>$ | 000 | If (c) = 1, (P) ← $<B_3><B_2>$. Otherwise, (P) = (P)+3. If the content of flip-flop c is one, then jump to the instruction located in memory location $<B_3><B_2>$; otherwise, execute the next instruction in sequence. |

CALL INSTRUCTIONS - Three Bytes
(three cycles - PCI/PCR/PCR)
Subroutines may be called and nested up to sevel levels.

| | | | | |
|---|---|---|---|---|
| CAL<br>(Call subroutine Unconditionally) | 01 | XXX<br>$<B_2>$<br>$<B_3>$ | 110 | (Stack) ← (P), (P) ← $<B_3><B_2>$. Shift the content of P to the pushdown stack. Jump unconditionally to the instruction located in memory location addressed by byte two and byte three. |
| CFc<br>(Call subroutine if Condition False) | 01 | $0C_4C_3$<br>$<B_2>$<br>$<B_3>$ | 010 | If (c) = 0, (Stack) ← (P), (P) ← $<B_3><B_2>$. Otherwise, (P) = (P)+3. If the content of flip-flop c is zero, then shift contents of P to the pushdown stack and jump to the instruction located in memory location $<B_3><B_2>$; otherwise, execute the next instruction in sequence. |
| CTc<br>(Call subroutine if Condition True) | 01 | $1C_4C_3$<br>$<B_2>$<br>$<B_3>$ | 010 | If (c) = 1, (Stack) ← (P), (P) ← $<B_3><B_2>$. Otherwise, (P) = (P)+3. If the content of the flip-flop c is one, then shift contents of P to the pushdown stack and jump to the instruction located in memory location $<B_3>$ $<B_2>$; otherwise, execute the next instruction in sequence. |

In the above JUMP and CALL instructions $<B_2>$ contains the least significant half of the address, and $<B_3>$ contains the most significant half of the address. Note that $D_6$ and $D_7$ of $<B_3>$ are "don't care" bits since the CPU uses fourteen bits of address.

RETURN INSTRUCTIONS - One Byte
(one cycle - PCI)
A return instruction may be used to exit from a subroutine; the stack is popped-up one level at a time.

| | | | | |
|---|---|---|---|---|
| RET | 00 | XXX | 111 | (P) ← (Stack). Return to the instruction in the memory location addressed by the last value shifted into the pushdown stack. The stack pops up one level. |
| RFc<br>(Return Condition False) | 00 | $0C_4C_3$ | 011 | If (c) = 0, (P) ← (Stack); otherwise, (P) = (P)+1. If the content of the flip-flop c is zero, then return to the instruction in the memory location addressed by the last value inserted in the pushdown stack. The stack pops up one level. Otherwise, execute the next instruction in sequence. |
| RTc<br>(Return Condition True) | 00 | $1C_4C_3$ | 011 | If (c) = 1, (P) ← (Stack); otherwise, (P) = (P)+1. If the content of flip-flop c is one, then return to the instruction in the memory location addressed by the last value inserted in the pushdown stack. The stack pops up one level. Otherwise, execute the next instruction in sequence. |

RESTART INSTRUCTION - One Byte
(one cycle - PCI)
The restart instruction acts as a one byte call on either specified locations of page 0, the first 256 instruction words.

| | | | | |
|---|---|---|---|---|
| RST | 00 | AAA | 101 | (Stack) ← (P), (P) ← (000000 00AAA000) Shift the contents of P to the pushdown stack. The content, AAA, of the instruction register is shifted into bits 3 through 5 of the P-counter. All other bits of the P-counter are set to zero. As a one-word "call", either eight-byte subroutines may be accessed in the lower 64 words of memory. |

APPENDIX II-continued
INPUT/OUTPUT INSTRUCTIONS

One Byte
(two cycles - PCI/PCC)
Eight input devices may be referenced by the input instruction.

INP    01    00M    MM1    (A)    (input data lines). The content of Register A is made available to external equipment at state T1 of the PCC cycle. The content of the instruction register is made available to external equipment at state T2 of the PCC cycle. New data for the accumulator is loaded at T3 of the PCC cycle. MMM denotes input device number. The content of the condition flip-flops, S,Z,P,C, is output on $D_0, D_1, D_2, D_3$ respectively at T4 on the PCC cycle.

Twenty-four output devices may be referenced by the output instruction.

OUT    01    RRM    MM1    (Output data lines) ← (A). The content of register A is made available to external equipment at state T1 and the content of the instruction register is made available to external equipment at state T2 of the PCC cycle. RRMMM denotes output device number (RR ≠ 00).

MACHINE INSTRUCTION

HALT INSTRUCTION - One Byte
(one cycle - PCI)

HLT    00    000    00X    On receipt of the Halt Instruction, the activity of the processor is immediately suspended in the STOPPED state. The content of all registers and memory is unchanged. The P-counter has been updated and the internal dynamic memories continue to be refreshed.
        or
        11    111    111

We claim:

1. A system for entering customer orders at point-of-sale stations, processing and recording said orders in a computer and returning processed order information to said stations for display, said system comprising:
   a. a keyboard terminal at each point-of-sale station, each of said keyboard terminals having
      1. a plurality of manually operable keys for designating various sales items as ordered,
      2. a plurality of display devices, each of said devices being associated with one manually operable item key,
      3. means for generating identifying electrical signals specific to individual keys whenever one of said keys is actuated, and
   b. a computer interconnecting said keys and said associated display devices and having logic means operative in response to said key identifying signals to cause the display devices associated with the actuated item keys to display the number of sales items ordered.

2. A system as set forth in claim 1 wherein said display devices have the capability to selectively display a series of individual numerals and the logic means of said computer increments each display numeral by one upon each successive actuation of the associated sales item key.

3. A system as set forth in claim 1 wherein:
   a.
      4. each of said keyboard terminals also has a plurality of manually operable numeral keys in addition to said manually operable sales item keys,
      5. said display devices are provided with means for selectively displaying a series of individual numerals, and
   b. the logic means of said computer operates in response to said electrical signals generated by the sequential actuation of a numeral key and a sales item key to cause the associated display device to display a number corresponding to the number of said numeral key.

4. A system as set forth in claim 1 wherein the logic means of said computer operates in response to electrical signals generated by the successive actuation of an item key, to cause said associated display device to increment each display numeral by one upon each successive actuation of said item key, and operates in response to the electrical signals generated by the sequential actuation of a numeral key and an item key, to cause the associated display device to display a number corresponding to the number of said numeral key.

5. A system as set forth in claim 4 wherein said computer is provided with a memory and said keyboard terminal is provided with at least one manually operable function key whose signal causes the logic means of the computer to store an order temporarily in the computer memory and to extinguish all display devices.

6. A system as set forth in claim 5 wherein a next succeeding actuation of said function key causes the logic means of the computer to relight the previously lighted display devices to redisplay the temporarily stored order.

7. A system as set forth in claim 6 wherein said keyboard terminal has three function keys for causing the logic means of the computer to temporarily store up to three separate orders.

8. A system as set forth in claim 4 wherein said keyboard terminal is also provided with at least one function key whose signal causes the logic means of the computer to total the price of the sales items ordered.

9. A system as set forth in claim 8 wherein said keyboard terminal is provided with a second function key whose signal causes the logic means of the computer to cancel all items ordered and to extinguish all display devices associated with the item keys.

10. a system as set forth in claim 8 wherein said keyboard terminal is also provided with at least one function key whose signal causes the logic means of the computer to total the price of the sales items ordered and automatically calculate and include the amount of tax due.

11. A system as set forth in claim 10 wherein said computer has a permanent memory and the sales order price and item quantities are entered into the permanent memory of the computer by said logic means only upon the actuation of said function key.

12. A system for entering and pricing customer orders at point-of-sale stations, processing and recording said orders in a computer and returning processed order information to said stations for display, means for reprogramming the computer for price changes, said means comprising:
   a. a keyboard terminal at each point-of-sale station, each of said keyboard terminals having,
      1. a plurality of manually operable sales item keys for designating various sales items as ordered,
      2. a plurality of manually operable numeral keys,
      3. a display device for displaying at least one-digit numerals,
      4. means for generating identifying electrical signals specific to individual keys whenever one of said keys is actuated,
   b. a computer interconnecting said manually operable sales item and numeral keys and said display device and having logic means responsive to said key identifying signals for automatically computing the total price of the sales items ordered as indicated by the operation of said keys, and
   c. control means for said computer including a manually operable price change key on the terminal, said control means being responsive to the operation of said price change key to place the logic means of said computer into a reprogramable condition, whereby price changes for each sales item are entered into the computer logic means by operating said manually operable price change key, and then sequentially actuating the numeral keys and a sales item key to set the new price for said sales item, said new price being displayed in said display device.

13. In a system for entering, pricing and computing the tax on customer orders at point-of-sale stations, processing and recording said orders in a computer and returning processed order information to said stations for display, means for reprogramming the tax computation function of the computer, said means comprising:
   a. a keyboard terminal at each point-of-sale station, each of said keyboard terminals having,
      1. a plurality of manually operable sales item keys for designating various sales items as ordered,
      2. a plurality of manually operable numeral keys,
      3. a display device for displaying dollars and cents,
      4. means for generating identifying electrical signals specific to individual numeral and item keys whenever one of said keys is actuated,
   b. a computer interconnecting said manually operable sales item and numeral keys and said display device and having logic means responsive to said key identifying signals for automatically computing the tax due on the sales items ordered as indicated by the operation of said keys, and
   c. control means for said computer including a manually operable tax change key on the terminal, said control means being responsive to the operation of said manually operable tax change key to place the logic means of said computer into a reprogramable condition wherein actuation of the manually operable tax change key, and the subsequent actuation of the numeral and item keys serve to set new tax schedules in the logic means of the computer.

* * * * *